(12) United States Patent
Kajita et al.

(10) Patent No.: US 7,973,882 B2
(45) Date of Patent: Jul. 5, 2011

(54) LIQUID CRYSTAL DISPLAY DEVICE

(75) Inventors: Daisuke Kajita, Hitachi (JP); Kentarou Ojima, Hitachi (JP); Ikuo Hiyama, Hitachinaka (JP); Masahiro Ishii, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 465 days.

(21) Appl. No.: 12/254,882

(22) Filed: Oct. 21, 2008

(65) Prior Publication Data

US 2009/0135346 A1    May 28, 2009

(30) Foreign Application Priority Data

Oct. 25, 2007  (JP) .................. 2007-277173

(51) Int. Cl.
*G02F 1/1335* (2006.01)
(52) U.S. Cl. ......................... 349/96; 349/117
(58) Field of Classification Search .......... None
See application file for complete search history.

(56) References Cited

U.S. PATENT DOCUMENTS

| | | | |
|---|---|---|---|
| 4,345,249 A | 8/1982 | Togashi | |
| 7,227,602 B2 * | 6/2007 | Jeon et al. | 349/119 |
| 7,719,647 B2 * | 5/2010 | Kajita et al. | 349/118 |
| 7,847,898 B2 * | 12/2010 | Jeon et al. | 349/119 |
| 2003/0098939 A1 | 5/2003 | Min et al. | |
| 2005/0206817 A1 * | 9/2005 | Kajita et al. | 349/119 |
| 2008/0192183 A1 * | 8/2008 | Kajita et al. | 349/96 |
| 2008/0198303 A1 * | 8/2008 | Taguchi | 349/96 |
| 2008/0204644 A1 * | 8/2008 | Toyama et al. | 349/118 |
| 2009/0135346 A1 * | 5/2009 | Kajita et al. | 349/96 |

FOREIGN PATENT DOCUMENTS

| | | |
|---|---|---|
| JP | 63-021907 | 5/1988 |
| JP | 09-080424 | 3/1997 |
| JP | 2001-056476 | 2/2001 |
| JP | 2001-350022 | 12/2001 |
| JP | 2005-208356 | 8/2005 |

OTHER PUBLICATIONS

"Development of Low-Retardation TAC Film for Color-Shift Improvement in LCDs", Ito et al, SID Symposium Digest of Technical Papers, The Society For information Display, Jun. 2006, vol. 37, Issue 1, pp. 1169-1172.

"Optically Compensated IPS-LCD for TV Applications", SID Symposium Digest of Technical Papers, May 2005, vol. 36, Issue 1, pp. 1160-1163, Kajita et al, The Society for information Display.

(Continued)

*Primary Examiner* — Michelle R Connelly Cushwa

(74) *Attorney, Agent, or Firm* — Antonelli, Terry, Stout & Kraus, LLP.

(57) ABSTRACT

There is provided a liquid-crystal-layer 15 in which an electrical field is applied in a direction parallel to a first substrate. Respective absorption axes of the first substrate provided with a first polarizing-plate 12 on a light-input side and a second substrate provided with a second polarizing-plate 11 on a light-output side are perpendicular. An optical axis of the liquid-crystal-molecule is parallel to the output polarizing-plate 11 and the absorption axis of the input polarizing-plate 12. A matrix-drive-electrode group is positioned on a side of the liquid-crystal-layer 15 of the first or second substrate. The input and output polarizing-plate are composed of a polarizing layer and a supporting-substrate material. The supporting-substrate material is present on the liquid-crystal-layer side of the polarizing layer. The supporting-substrate material of one of the input or output polarizing-plate is birefringent, and the Nz coefficient being 4 or more. The other supporting-substrate material is optically isotropic.

10 Claims, 21 Drawing Sheets

OTHER PUBLICATIONS

"Study on Phase Retardation Of Fringe-Field Driven Homogeneously Aligned LC Cell", Proc Int Disp Workshops, vol. 10, pp. 113-116; 2003, Jung et al.

Berreman, "Optics in Stratified and Anisotropic Media: 4x4 Matrix Formulation," J. Opt. Soc. Am., 1972, vol. 62, No. 4, p. 502-510.

* cited by examiner

M=−1.93

M=−0.6

M=−0.2

M=0

LIQUID CRYSTAL DISPLAY DEVICE

CROSS-REFERENCE TO RELATED APPLICATION

The present application claims priority from Japanese application JP2007-277173 filed on Oct. 25, 2007, the content of which is hereby incorporated by reference into this application.

BACKGROUND OF THE INVENTION

1. Field of the Invention

The present invention relates to a liquid crystal display device, and particularly relates to an in-plane switching mode (IPS mode) liquid crystal display device in which liquid crystal molecules are homogeneously oriented during black display, and an electrical field is applied to the molecules in a lateral direction, whereby light transmittance and blockage are controlled. The present invention is ideal for significantly improving the viewing-angle characteristics (particularly for black display and low gradation) of such a device.

2. Description of the Related Art

Liquid crystal display devices (also called "liquid crystal displays") are basically composed of a liquid crystal (a layer of liquid crystal molecules, or liquid crystal layer) sandwiched between a pair of substrates. Among liquid crystal display devices of a system in which the direction of the electrical field applied to the liquid crystal is made parallel to the substrates (also referred to below as lateral electrical-field systems or IPS mode), systems employing a comb-tooth electrode provided on one substrate have been proposed in Japanese Examined Patent Application No. 63-21907, Japanese Laid-open Patent Application No. 9-80424, and Japanese Laid-open Patent Application No. 2001-056476. In these systems, the liquid crystal molecules primarily rotate in a plane parallel to the substrate due to the application of the electrical field. It is therefore well-known that the difference in the degree of birefringence when viewed diagonally between periods when an electrical field is applied and periods when a field is not applied is small, and the viewing angle is wide in these systems.

However, although changes in birefringence of the liquid crystal itself are small in IPS-mode liquid crystal display devices, it is known that, due to the characteristics of the polarizing plates layered on the substrates, light may leak out on viewing from a diagonal direction oriented away from the absorption axis of the polarizing plates. A method for using a retardation plate in order to stop such light leakage of polarizing plates in the diagonal direction has been disclosed in Japanese Laid-open Patent Application No. 2001-350022. However, the method disclosed in Japanese Laid-open Patent Application No. 2001-350022 basically improves the viewing angle of the polarizing plates alone. The effect of the liquid crystal was considered for VA mode, but a system for compensating for the effect of the liquid crystal layer in IPS mode is not disclosed in Japanese Laid-open Patent Application No. 2001-350022.

Disclosed in Japanese Laid-open Patent Application No. 2005-208356 is an invention for positioning a retardation plate to the inside of one of the polarizing plates in order to improve the viewing angle characteristics of black display. The invention disclosed in Japanese Laid-open Patent Application No. 2005-208356 also takes into account the effects of the supporting-substrate material of the polarizing plates and of coloring in the diagonal viewing angle during black display, and good performance can be expected. However, the necessary retardation plates are optically biaxially anisotropic media, positive C-plates (where nx=ny for the refractive index within a plane xy, and nz>nx for the refractive index nz in the thickness direction z), negative A-plates (where nx>ny, and nx=nz), or other materials having low productivity, and costs are therefore high.

SUMMARY OF THE INVENTION

As described above, brightness increases and coloring occurs in the diagonal direction during black display in in-plane switching mode (IPS mode) liquid crystal display devices in which liquid crystal molecules are homogeneously oriented during black display, and the twist of the liquid crystal molecules due to a primarily lateral electrical field is used to control light transmittance and blockage. It is an object of the present invention to provide a liquid crystal display device in which such coloring and increases in brightness in the diagonal direction during black display are remedied at a low cost without relying on special retardation plates, as is conventional.

In order to achieve the aforementioned object, in a representative configuration of the liquid crystal display device according to the present invention, respective absorption axes of a light-input-side first substrate, which is provided with a first polarizing plate, and a light-output-side second substrate, which is provided with a second polarizing plate, are substantially perpendicular (the smaller angle being 88° to 90°), and an optical axis of a liquid crystal molecule is oriented so as to be substantially parallel to the first substrate or the second substrate and substantially parallel (the smaller angle being 0° to 2°) to the absorption axis of the first polarizing plate. The liquid crystal display device of the present invention comprises a liquid crystal layer in which an electrical field is applied in a direction parallel to the first substrate, whereby the liquid crystal molecule rotates in a plane predominantly parallel to the first substrate. Also provided is a matrix-drive electrode group, in which a pixel electrode for individual pixels and a shared electrode are positioned on a side near the liquid crystal layer of one substrate among the first substrate and the second substrate. A rear-surface illuminating device is present on the light-input first-substrate side. The first substrate and the second substrate are provided with respective polarizing plates. The polarizing plates are composed of a polarizing layer and associated supporting-substrate material (double as a layer for protecting the polarizing layer). Some polarizing plates have a layer for protecting the polarizing layer. The first polarizing plate and the second polarizing plate have a first supporting-substrate material (or layer for protecting the polarizing layer) on at least a liquid-crystal layer side of the polarizing layer of one of the polarizing plates, or have a second supporting-substrate material (or layer for protecting the polarizing layer) on the polarizing layer of the other polarizing plate, the second supporting-substrate material having different optical characteristics from the first supporting-substrate material (or layer for protecting the polarizing layer). The first supporting-substrate material (or layer for protecting the polarizing layer) is birefringent (the in-plane or thickness-direction retardation is 10 nm or more) and has an Nz coefficient of 4 or more. The second supporting-substrate material (or layer for protecting the polarizing layer) is optically isotropic (the retardation in plane and in the thickness direction is less than 10 nm). The descriptions below will grant the characteristics of the present invention to the supporting-substrate material, but the essence of the present invention is the same when the characteristics of the present invention are granted to a layer for protecting the polarizing layer instead of a supporting-substrate material. Repetitive descriptions will therefore be omitted.

The liquid crystal display device of the present invention has the aforedescribed configuration, whereby the phase differences of the respective optical members, the configuration resulting from the optical phase-compensating member, the liquid crystal layer, and the polarizing plates, which are composed of a polarizing layer and a supporting-substrate material, were stipulated, whereby reductions in brightness and coloring in diagonal viewing angles during black display can be implemented without relying on special retardation plates.

DETAILED DESCRIPTION OF THE INVENTION

As liquid crystal televisions come into prominence, an important consideration is the question of how a non-light-emitting liquid crystal display will transmit light from an illuminating device during white display and block light during black display. The present invention particularly relates to the question of how to reduce brightness when viewing from the diagonal during black display while simultaneously preventing coloring. The basic principles of the present invention will be described below, after which preferred embodiments of the present invention will be described in detail using examples.

Figure 3:
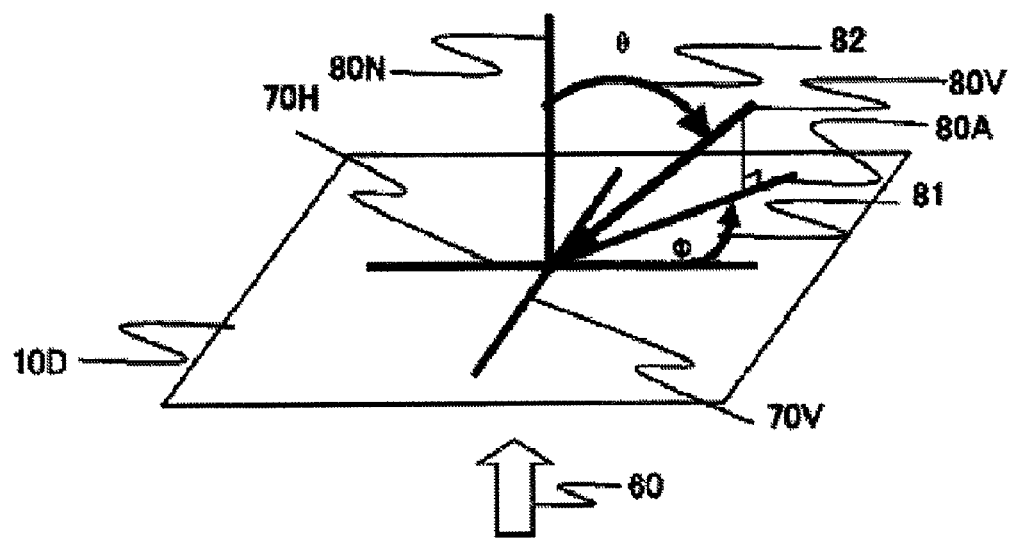
FIG. 3 is a conceptual diagram that shows the definition of the viewing angle in the present specification.
Figure 4:
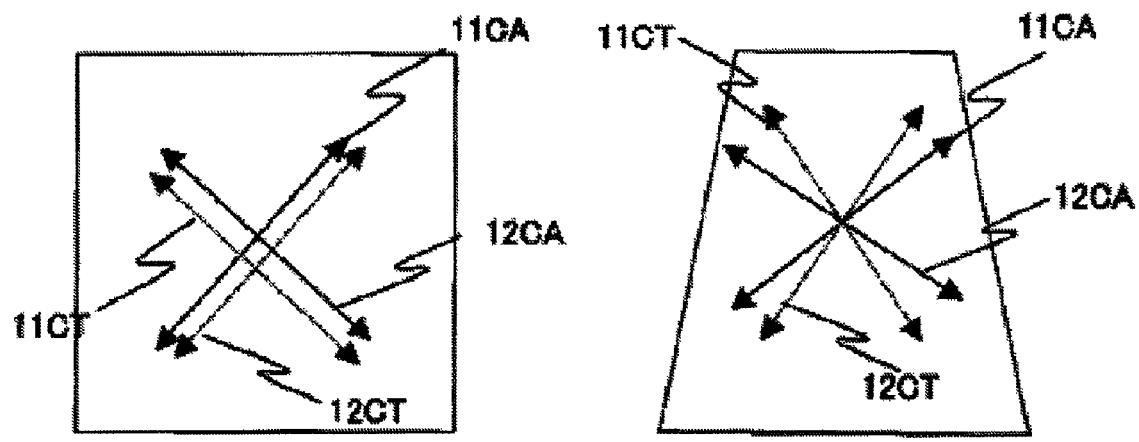
FIG. 4 is a conceptual diagram in which the viewing-angle characteristics of a polarizer are described.
Figure 5:
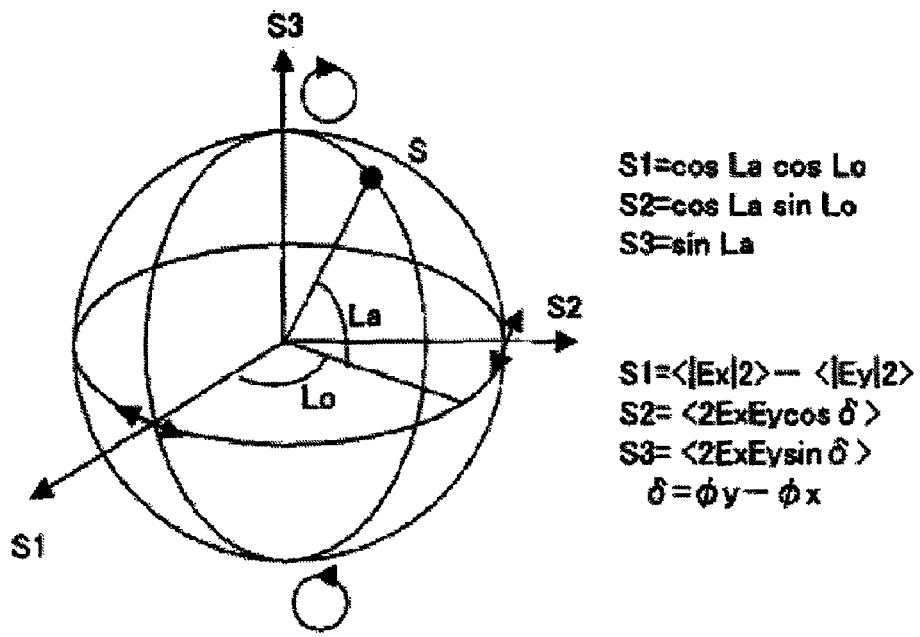
FIG. 5 is a descriptive diagram of a Poincaré sphere.

FIG. 3 is a conceptual diagram of visual definitions for describing the present invention. FIG. 4 is a conceptual diagram for describing the viewing-angle characteristics of a polarizer. FIG. 5 is a descriptive diagram of a Poincaré sphere. The polarizing plate on the output side is designated "11", and the polarizing plate on the input side is designated "12". In FIG. 3, light 60 enters from an illuminating device, is modulated by the liquid crystal layer, and then exits via a display surface 10D. In this case, "80N" indicates the normal direction to the display surface 10D, "70H" indicates the horizontal direction, "70V" indicates the vertical direction, "80V" indicates the viewing direction, θ indicates a viewing angle 82, 80A indicates the projection on the display surface 10D of the viewing direction 80V, and Φ indicates an azimuth angle 81 formed by the horizontal direction 70H and the projection 80A.

The reasons for light leakage in the pair of orthogonal polarizing plates will be considered for the azimuth angle Φ when θ≠0° and Φ≠90n° (where n=0, 1, 2, 3). When absorption axes 11CA and 12CA (or transmission axes 11CT, 12CT) of the two polarizing plates are orthogonal, as in the left side of FIG. 4, the light input from the normal direction of the polarizing plates becomes linearly polarized by the polarizing plate on the input side and is absorbed by the polarizing plate on the output side, allowing black display. On the other hand, on viewing from a diagonal direction (when θ≠0° and Φ≠90n° (where n=0, 1, 2, 3)), as shown in the right side of FIG. 4, a component parallel to the transmission axis of the polarizing plate on the opposite side is present, the light is not completely blocked by the polarizing plate on the opposite side, and light leakage occurs. When a parallel oriented liquid crystal layer is positioned between the orthogonal polarizing plates, the effect of the liquid crystal layer will not be evident if the orientation axis of the liquid crystal layer is parallel to the absorption axis of the input polarizing plate. However, the investigations of the present inventors revealed that the effect of the liquid crystal layer will be evident when the orientation axis of the liquid crystal layer is offset, or when the two polarizing plates are offset from orthogonality.

The use of a Poincaré-sphere display makes these polarization states very readily understood. Poincaré-sphere displays are disclosed in Chapter 5, p. 102 to 163 of "Crystal Optics" ("Kesshou Kougaku"), 1984 First Edition, Fourth Printing, edited by the Japan Society of Applied Physics, Optics Association, and published by Morikita Publishing, K. K. When the plane perpendicular to the direction of travel of the light is defined by the x, y axes, the amplitudes of the electrical fields along those axes are Ex, Ey, respectively, and the relative phase difference between Ex and Ey is δ (=δy−δx), the Stokes parameters S0, S1, S2, S3 are represented by $$S0=<|Ex|^2>+<|Ey|^2>$$

$$S1=<|Ex|^2>-<|Ey|^2>$$

$$S2=<2ExEy \cos \delta>$$

$$S3=<2ExEy \sin \delta>$$

and, in the case of complete polarization, $S0^2=S1^2+S2^2+S3^2$. FIG. 5 shows the result of representing this state on a Poincaré sphere. In other words, the S1, S2, S3 axes are on each of the axes of the spatial orthogonal coordinate system, and the S point that designates the polarization state is positioned on the surface of a sphere having a radius of the intensity S0. $S0^2=S1^2+S2^2+S3^2$ in state of complete polarization, and therefore, when considering the point at a polarization state S on a sphere having a radius of 1, creating expressions using a latitude La and a longitude Lo yields $$S1=\cos La \cdot \cos Lo$$

$$S2=\cos La \cdot \sin Lo$$

$$S3=\sin La$$

For the Poincaré sphere here, the upper hemisphere is rightward polarization, the lower hemisphere is leftward polarization, the equator is linear polarization, and the upper and lower poles are right circular polarization and left circular polarization, respectively.

Figure 6:
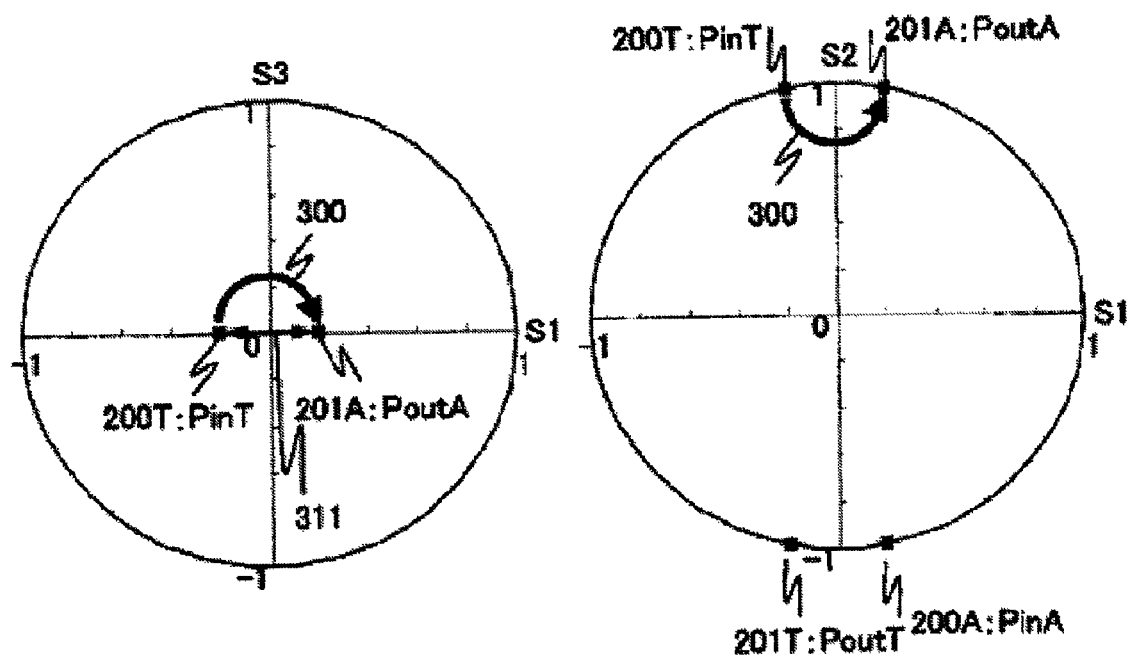
FIG. 6 is a descriptive diagram in which the viewing angle characteristics of a polarizer are expressed using a Poincaré sphere.

The result of considering the state of FIG. 4 as a Poincaré sphere is shown in FIG. 6. FIG. 6 is a descriptive drawing that expresses the viewing angle characteristics of a polarizer using a Poincaré sphere. FIG. 6 is a case of viewing from an azimuth angle Φ=45°, θ=60°, where the right side is the projection on the S1-S2 surface, and the left side is the projection on the S1-S3 surface. The polarization state of the polarization-plate transmission axis 12CT on the light-input side is 200T, the linear polarization containing a polarization component in the absorption axis 12CA is 200A, the polarization state of the polarization-plate transmission axis 11CT on the light-output side is 201T, and the linear polarization having a polarization component in the absorption axis 11CA is 201A. In other words, a distance 311 between 200T and 201A is the light leakage. It can therefore be understood that light leakage can be prevented by performing a transformation 300 on the polarization state of 200T to the polarization state of 201A.

An idealized state of the polarizing layer alone was considered in FIG. 6, but in a standard polarizing plate, a supporting-substrate material (or a layer for protecting the polarizing layer) is positioned on both sides of the polarizing layer. This supporting-substrate material is usually composed of triacetyl cellulose (TAC) and has substantially no in-plane phase difference, but has a retardation R-h in the thickness direction. When the in-plane slow axis of the supporting-substrate material is parallel to the direction of the x axis, the respective refractive indices in the direction of the x, y axes are nx, ny, the refractive index in the thickness direction is nz, and the thickness is h, $$R \cdot h = ((nx+ny)/2 - nz) \cdot h$$

This value is positive for a general polarizing-plate-supporting substrate material composed of TAC, which is known to have characteristics optically similar to so-called negative C-plates. No effect on the polarization state due to this retardation R-h is evident for perpendicular input, but the effect of the supporting-substrate material is evident during diagonal input, and the polarization state changes.

Figure 1:
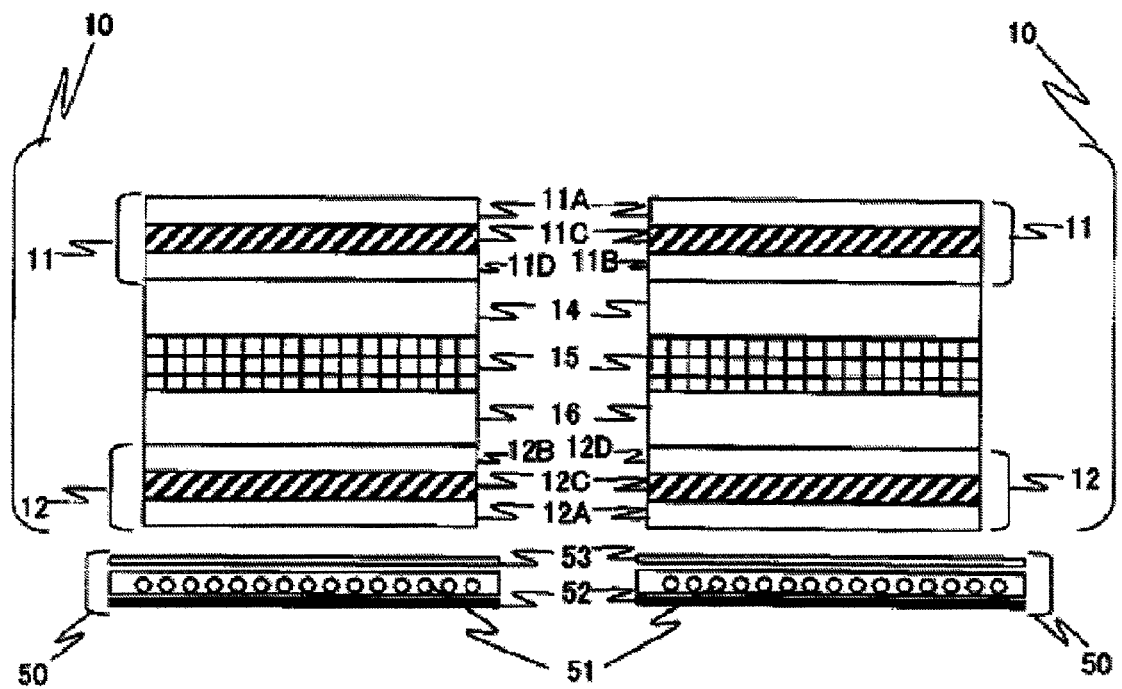
FIG. 1 is a configuration diagram that shows examples of the liquid crystal display device of the present invention.
Figure 2:
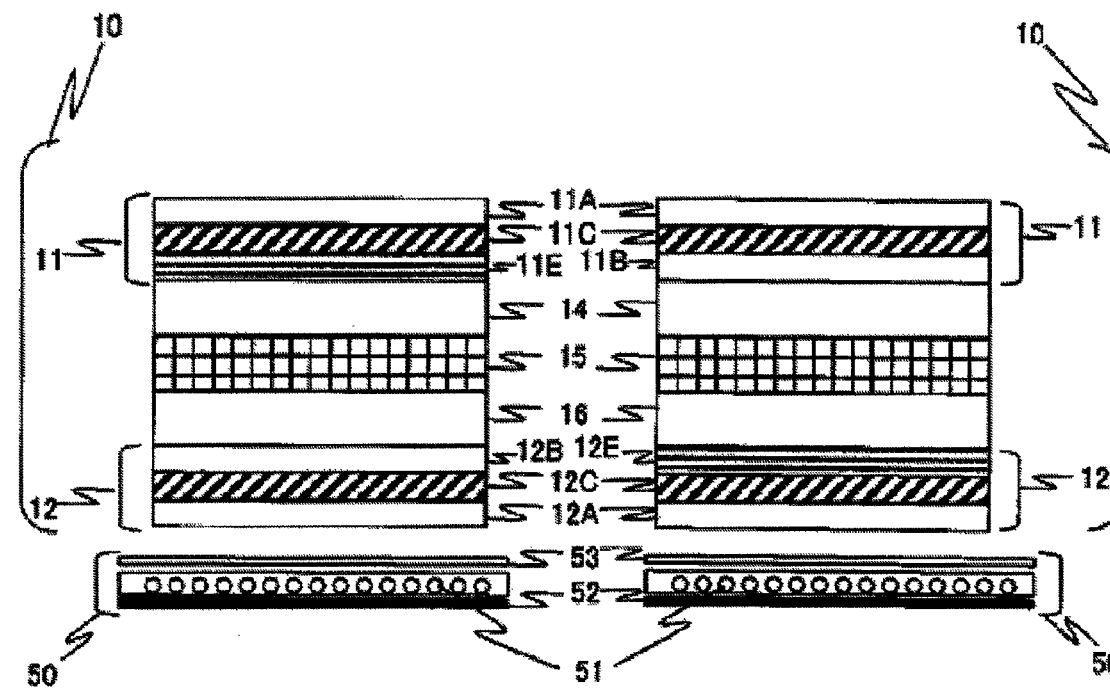
FIG. 2 is a configuration diagram that shows examples of the liquid crystal display device of the present invention.
Figure 7:
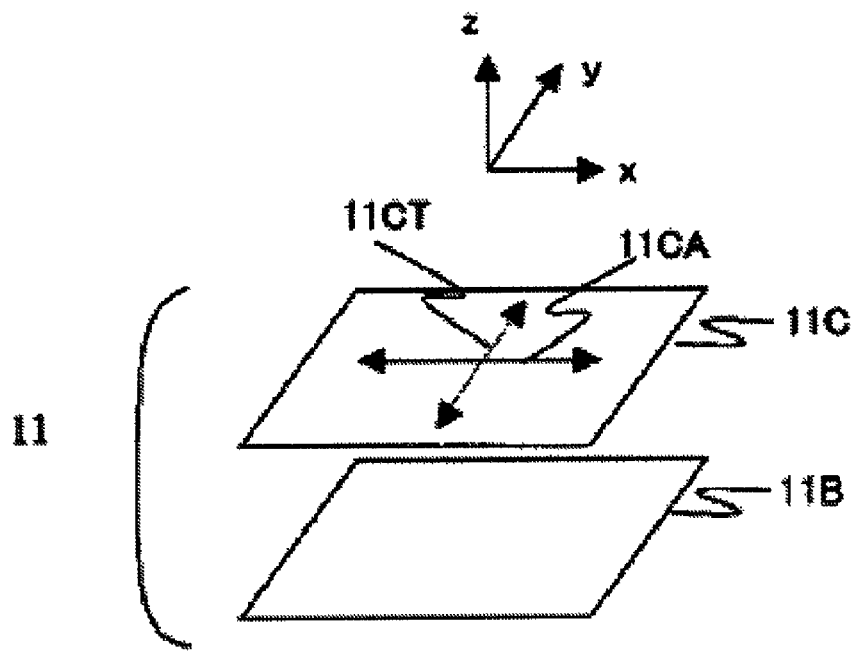
FIG. 7 is a general optical configuration diagram that has been conventionally used for IPS-system liquid crystal display devices.
Figure 7:
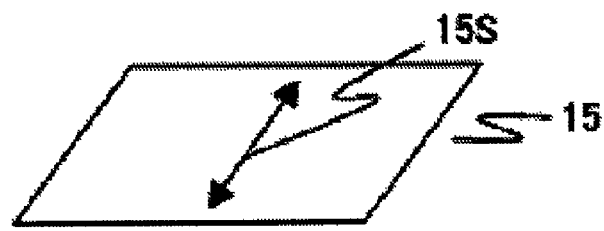
Figure 7:
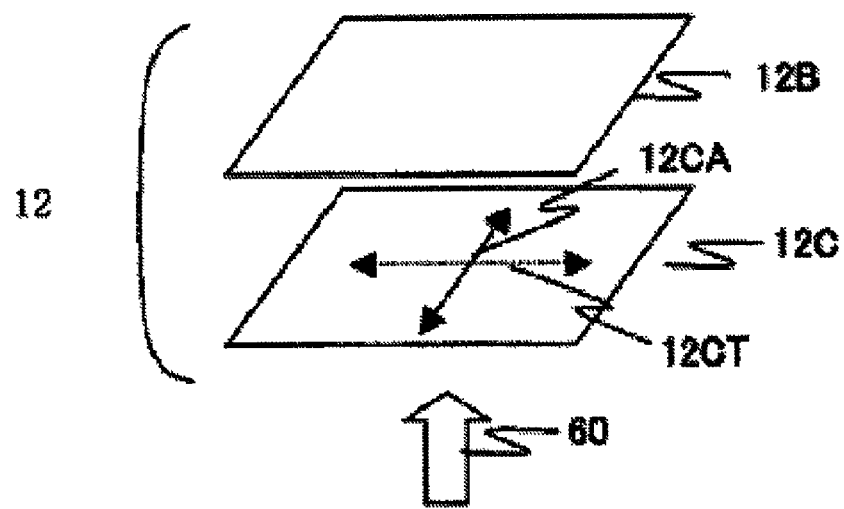

The changes in the polarization state in the optically layered configuration shown in FIG. 7 will now be considered. FIG. 7 is a general optical configuration diagram that has come to be conventionally used for IPS-system liquid crystal display devices. The first polarizing plate (input polarizing plate) 12 and the second polarizing plate (output polarizing plate) 11 are positioned on either side of a liquid crystal layer 15. A general supporting-substrate material (first supporting-substrate material) 12B and supporting-substrate material (second supporting-substrate material) 11B composed of TAC are positioned to the inside of the input polarizing plate (first polarizing plate) 12 and the output polarizing plate (second polarizing plate) 11, respectively. An orientation axis 15S of the liquid crystal is positioned parallel to the absorption axis 12CA of the input polarizing plate 12, perpendicular to the transmission axis 12CT, perpendicular to the absorption axis 11CA of the output polarizing plate 11, and parallel to the transmission axis 11CT in this case. This state is called o-mode. When the axes of the upper and lower polarizing plates as shown in FIG. 7 are rotated 90°; i.e., when the orientation axis 15S of the liquid crystal is perpendicular to the absorption axis 12CA of the input polarizing plate 12, parallel to the transmission axis 12CT, parallel to the absorption axis 11CA of the output polarizing plate 11, and perpendicular to the transmission axis 11CT, the state is referred to as e-mode. Supporting-substrate materials 11A, 12A as shown in the hereinafter-described FIGS. 1, 2 are usually positioned to the outside of polarizing layers 11C, 12C but have been omitted here, because these layers are not necessary for considering the polarization state.

Figure 8:
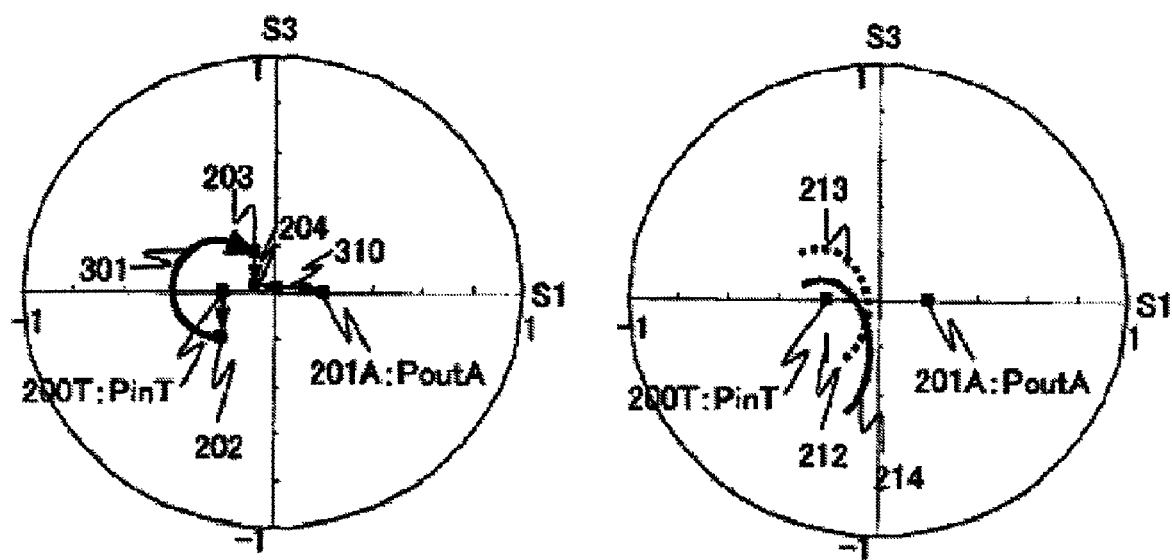
FIG. 8 is a Poincaré-sphere display of the change in polarization state of the diagonal viewing angle during black display for a conventional IPS-system liquid crystal display device.

Changes in the polarization state of the configuration in FIG. 7 will be considered on a Poincaré sphere using the left side of FIG. 8. The refractive-index anisotropy of the liquid crystal layer 15 is ΔnLC, the gap thereof is dLC, and the product ΔnLC·dLC is the retardation. The IPS system of Japanese Laid-open Patent Application No. 9-80424 will be assumed, and the retardation of the liquid crystal layer 15 will be set at 300 nm. Unless otherwise stated, the values of the various properties below will be the values for light having a wavelength of 550 nm. When considering light viewed from an azimuth angle Φ=45° and a viewing angle θ=60° as in FIG. 6, the polarization state of the light transmitted through the transmission axis 12CT of the polarizing layer 12C is 200T, which is designated "P in T". Due to the retardation R1·h1 of the supporting-substrate material 12B, the S1 axis is rotated by the amount of the retardation R1·h1 in the clockwise direction as viewed from the −1 side, and a transformation is made to the leftward elliptical polarization of a polarization state 202. Due to the liquid crystal layer 15, clockwise rotation (arrow 301) then occurs about the 200T point by the amount of the retardation ΔnLC·dLC of the liquid crystal layer, and a transformation is made to the rightward elliptical polarization of a polarization state 203. Due to the retardation R2·h2 of the supporting-substrate material 11B of the output polarizing plate 11, the S1 axis is then rotated by the amount of the retardation R2·h2 in the clockwise direction as viewed from the −1 side, and a transformation is made to the rightward elliptical polarization of a polarization state 204. The polarization state (designated "P out A") that is aligned with the absorption axis 11CA of the output polarizing layer 11C is 201A, and light leaks by an amount of a distance 310 between the polarization states 204 and 201A.

The left side of FIG. 8 was used to consider 550-nm light, but light of 400 nm to 700 nm, which is approximately equivalent to the visible-light spectrum, will be considered using the right side of FIG. 8. When considering light viewed from an azimuth angle Φ=45° and a viewing angle θ=60° as in FIG. 6, the polarization state of the light transmitted through the transmission axis 12CT of the polarizing layer 12C is 200T. Due to the retardation R1·h1 of the supporting-substrate material 12B, the S1 axis is rotated by the amount of the retardation R1·h1 in the clockwise direction as viewed from the −1 side, and a transformation is made to the leftward elliptical polarization of a polarization state 212. As concerns the length of the line of the polarization state 212, it should be mentioned that the retardation changes depending on the wavelength, and therefore transformations are made to different polarization states depending on the wavelength of the light. Due to the liquid crystal layer 15, clockwise rotation then occurs about the 200T point by substantially the amount of the retardation ΔnLC·dLC of the liquid crystal layer, and a transformation is made to the elliptical polarization of a polarization state 213, which widens according to the wavelength.

Short wavelengths give leftward elliptical polarization, and long wavelengths give rightward elliptical polarization, as can be understood from the right side of FIG. 8. Due to the retardation R2·h2 of the supporting-substrate material 11B of the output polarizing plate 11, the S1 axis is then rotated by the amount of the retardation R2·h2 in the clockwise direction as viewed from the −1 side, and a transformation is made to the elliptical polarization of a polarization state 214. The polarization state that is aligned with the absorption axis 11CA of the output polarizing layer 11C is 201A, and the fact that light leaks by an amount of the distance between the polarization states 214 and 201A is understood, where the amount of light leakage changes depending on the wavelength. The occurrence of coloring when viewing diagonally can therefore be understood.

It follows from the above description that the light leakage and coloring in diagonal viewing angles during black display of an IPS-mode liquid crystal display device is significantly different from what occurs in the orthogonally-positioned polarizing plates.

A standard TAC film generally used in LCDs was assumed as the polarizing-plate-supporting substrate material in FIG. 7, but in SID 06 Digest, "Development of Low-Retardation TAC Film for Color-Shift Improvement in LCDS", pp. 1169-1172 (2006), a polarizing-plate-supporting substrate material having substantial optical isotropy for all angles of transmitted light was presented. The optical configuration of FIG. 9 was also presented in the same publication. Polarizing-plate-supporting substrate materials 11D and 12D are polarizing-plate-supporting substrate materials having optical isotropy.

Figure 9:
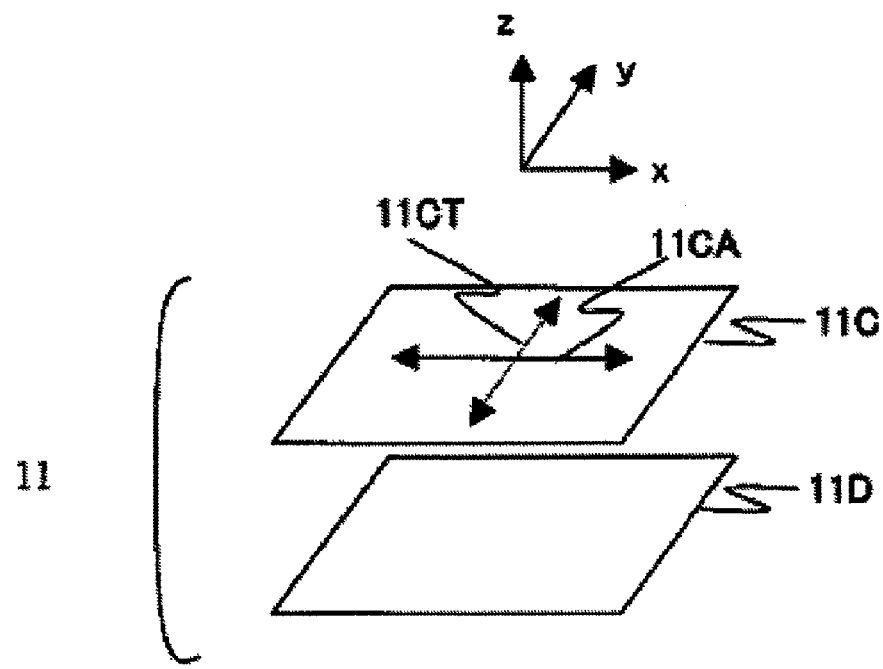
FIG. 9 is an optical configuration diagram of an IPS-system liquid crystal display device according to the prior art.
Figure 9:
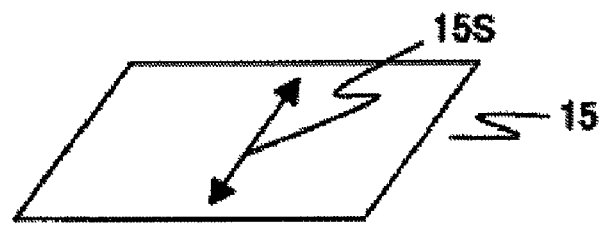
Figure 9:
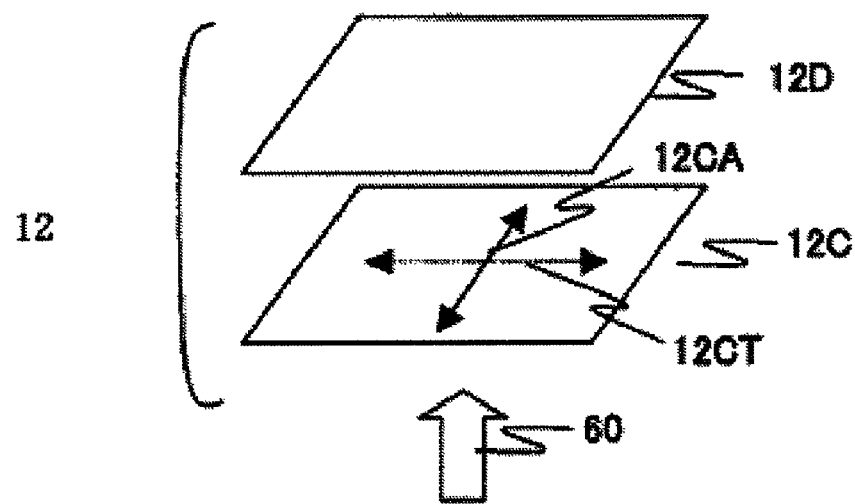

Coloring in diagonal viewing angles during black display is significantly improved by using the optical configuration of FIG. 9. In this configuration, the effects of the birefringent medium on diagonally-transmitted light are not evident during black display, and therefore separations in polarization state for each wavelength also do not occur. The viewing characteristics during black display therefore become substantially equal for the two polarizing plates, whose absorption axes are orthogonal.

However, light leakage in diagonal viewing angles during black display cannot be reduced using the optical configuration of FIG. 9. As described above, the polarizing layer itself has viewing-angle characteristics that generate light leakage in diagonally-transmitted light. The viewing-angle characteristics of these polarizing layers are directly reflected in the viewing-angle characteristics of the liquid crystal display device in configuration of FIG. 9.

Figure 10:
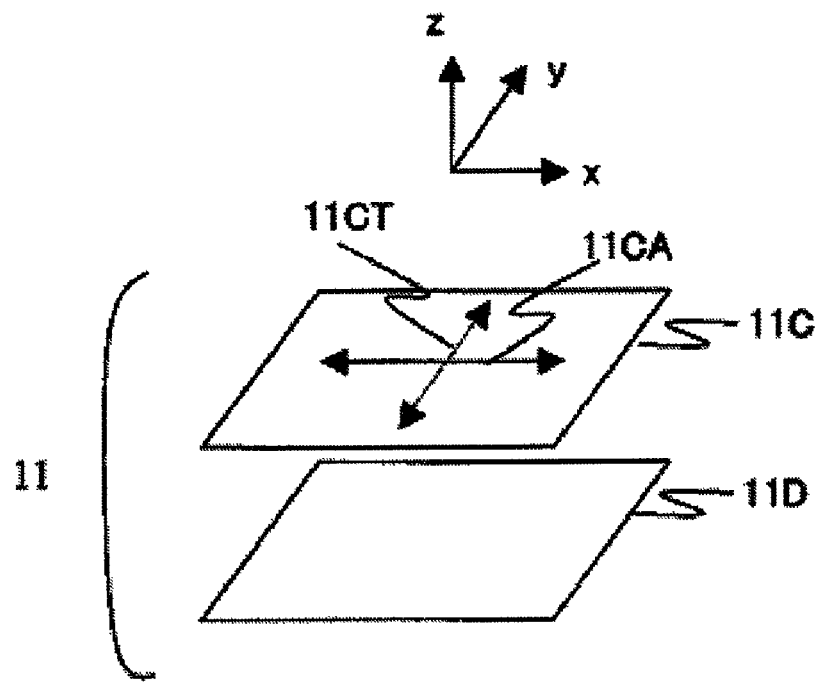
FIG. 10 is a diagram that shows an example of an optical configuration diagram of the liquid crystal display device of the present invention.
Figure 10:
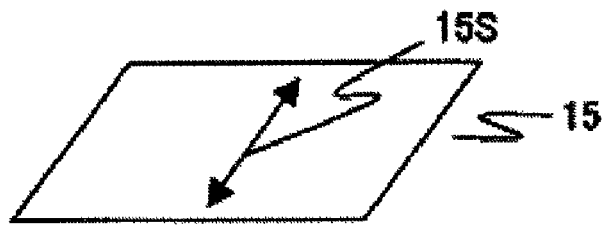
Figure 10:
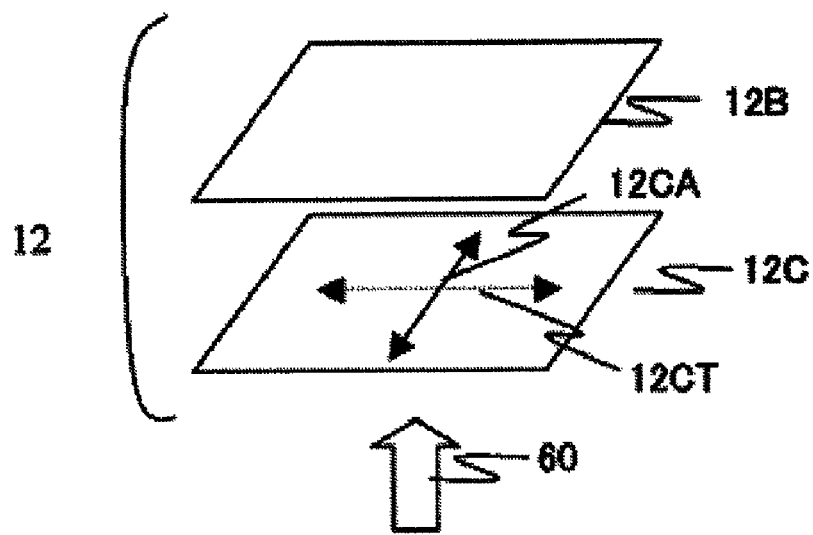

The present invention will be described below. The o-mode optical configuration of the present invention is shown in FIG. 10. The supporting-substrate material 12B to the inside of the lower (input) polarizing plate is a general polarizing-plate-supporting substrate material composed of TAC, which optically functions substantially as a negative C-plate, as described above. The supporting-substrate material 11D to the inside of the upper polarizing plate is a polarizing-plate-supporting substrate material having optical isotropy. The IPS-format liquid crystal layer can be used as a so-called positive A-plate in this configuration.

Figure 11:
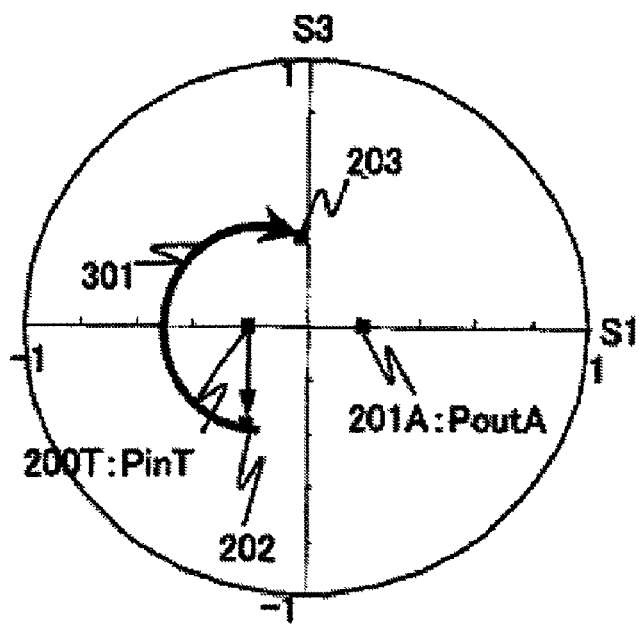
FIG. 11 is a Poincaré-sphere display for describing the liquid crystal display device of the present invention.

FIG. 11 is a Poincaré sphere showing the changes in polarization state for the optical configuration in FIG. 10 in a diagonal viewing angle during black display. The retardation of the liquid crystal layer is approximately 300 nm for an IPS format having a comb-tooth electrode as disclosed in Japanese Laid-open Patent Application No. 9-80424. Changes in polarization state due to the liquid crystal layer are therefore far from the polarization state 201A, which can be absorbed at the upper polarizing layer as in FIG. 11. A compensatory method for using biaxial retardation plates was presented in SID 05 Digest, "Optically Compensated IPS-LCD for TV Applications", pp. 1160-1163 (2005), but, as mentioned above, costs are high.

Figure 12:
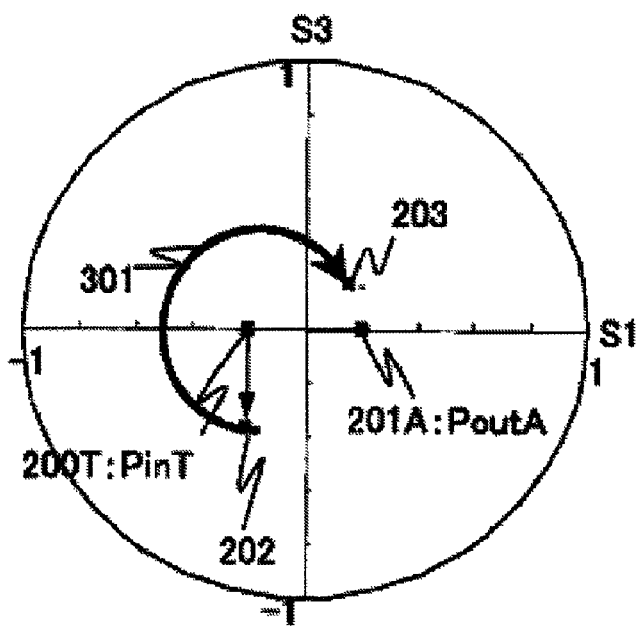
FIG. 12 is a Poincaré-sphere display for describing the liquid crystal display device of the present invention.

As concerns the IPS system using a fringe field disclosed in Japanese Laid-open Patent Application No. 2001-056476, IDW'03 Proc., "Study on Phase Retardation of Fringe-Field Driven Homogeneously Aligned LC Cell", pp. 113-116 (2003) discloses that the retardation of the liquid crystal layer is increased approximately 400 nm more than IPS systems employing comb-tooth electrodes, thereby engendering advantages in that productivity and transmittance during white display are improved. In FIG. 12, an IPS system employing this fringe field is assumed, and the changes in polarization state in the diagonal viewing angle during black display for the optical configuration of FIG. 10 are shown on a Poincaré sphere. The retardation of the liquid crystal layer is increased, and therefore it can be understood that diagonal light leakage during black display is decreased in comparison to FIG. 11.

The retardation of the liquid crystal layer and the retardation in the thickness direction of the supporting-substrate material to the inside of the lower polarizing plate have effects on the viewing-angle characteristics during black display in the optical configuration of FIG. 10, as is made clear from the descriptions up to this point. Accordingly, the ideal combination of these factors was determined using a simulation. In the simulation, the spectral characteristics of the three-wavelength cold cathodes used for normal backlighting, the spectral transmission characteristics of the R, G, B color filters used normally, and the spectral characteristics of a Nitto Denko 1224DU for the polarizing layers of the polarizing plates were used. A nematic liquid crystal having an extraordinary refractive index of 1.573 and an ordinary refractive index of 1.484 was assumed as the liquid crystal molecule contained in the liquid crystal layer, and the cell gap changes so that the retardation of the liquid crystal layer changes. The spectral characteristics of a general polarizing-plate-supporting substrate material composed of TAC were applied to the lower polarizing-plate-supporting substrate material.

Figure 13:
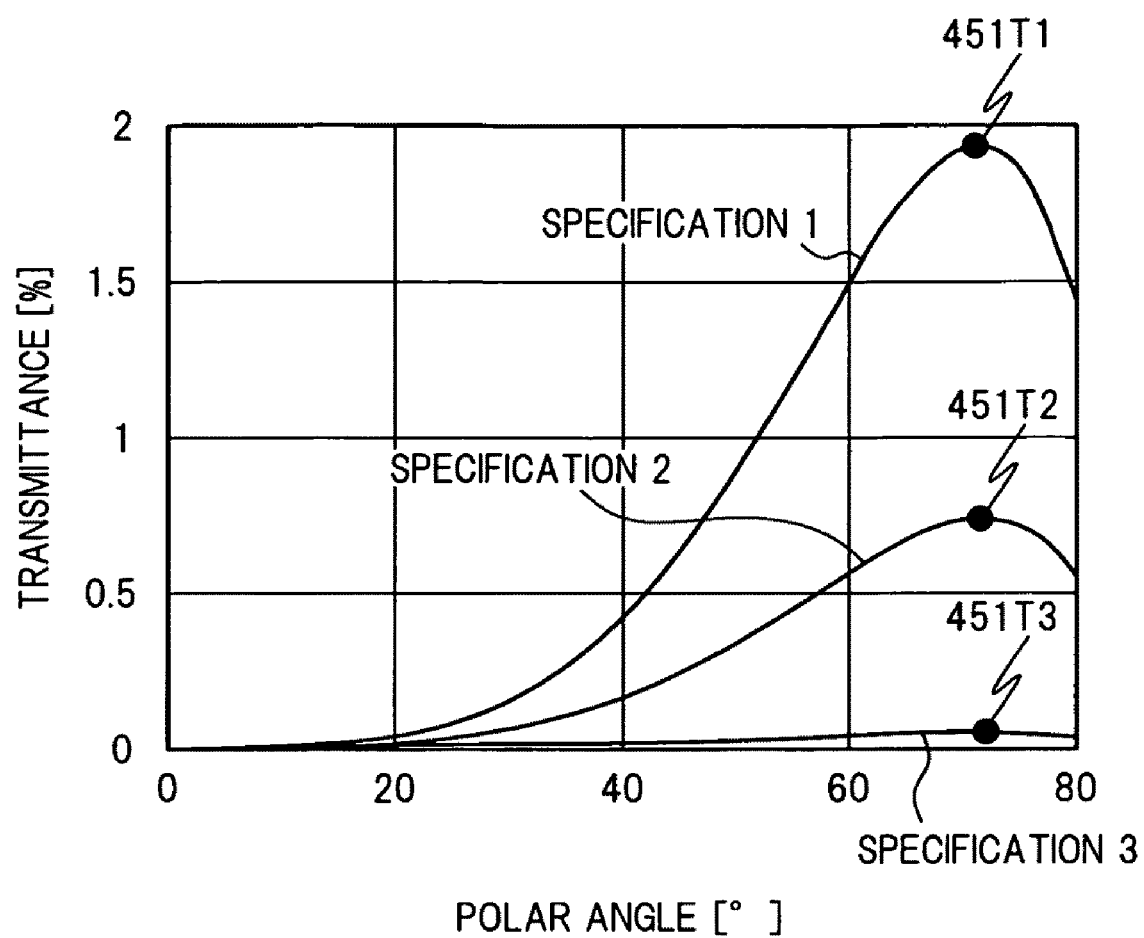
FIG. 13 is a conceptual diagram for describing an index of maximum transmittance for all viewing angles.

The maximum transmittance for all viewing angles was used as a viewing-angle performance index. The associated definition is shown in FIG. 13. The viewing-angle transmittance characteristics during black display for three types of IPS-system liquid crystal display devices having different specifications are evaluated in FIG. 13. The transmittance is shown for a fixed azimuth angle, where only the polar angle is changed. FIG. 13 demonstrates that specification 3 has the most favorable viewing-angle performance during black display. It can be seen here that the same results are obtained even when comparing the maximum transmittance values for the respective specifications. The maximum transmittance values for specifications 1, 2, 3 are 451T1, 451T2, and 451T3, respectively. If the maximum transmittance value is small, the change in brightness accompanying a change of the viewing angle can thus also be said to be small.

Figure 14:
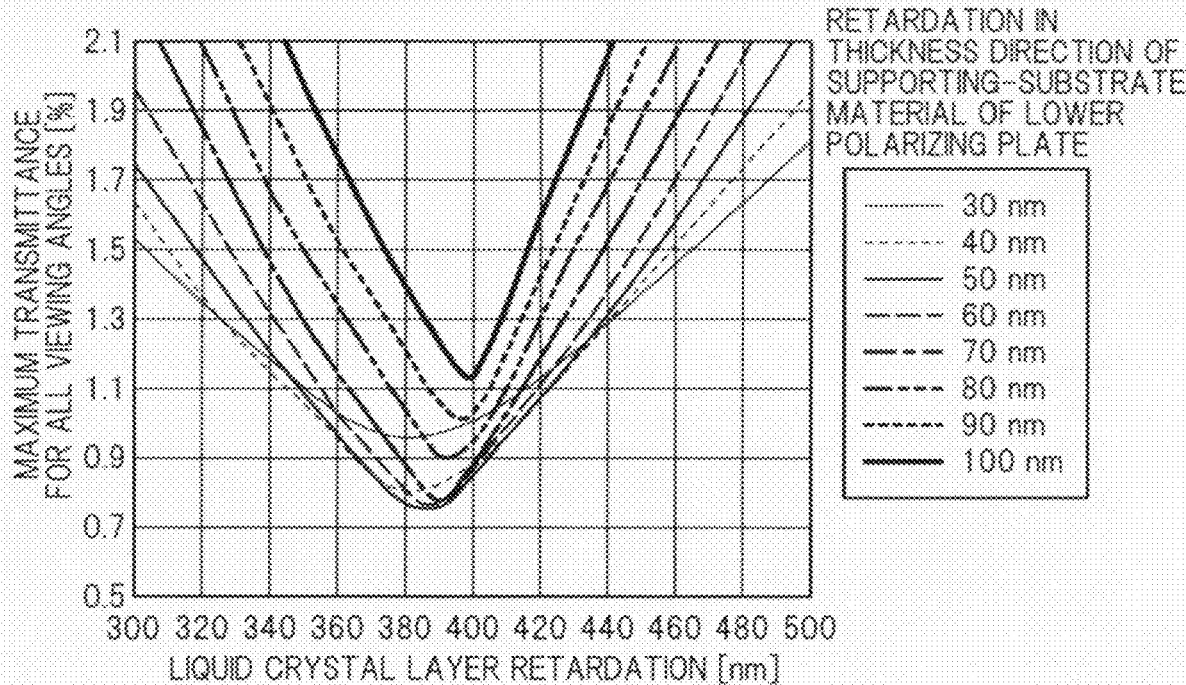
FIG. 14 is a characteristic diagram for describing the effects of the present invention.

The simulation results are shown in FIG. 14. The maximum transmittance for all viewing angles is 2.2% for the optical configuration of FIG. 7. Considering that a value of half this value is to be attained by the present invention, it can be seen that the retardation in the thickness direction of the lower polarizing-plate-supporting substrate material should be approximately 30 nm to 70 nm, and the retardation of the liquid crystal layer should be approximately 340 nm to 420 nm. This result is in accordance with the range of retardation in the thickness direction of general polarizing-plate-supporting substrate materials composed of TAC and of retardation in an ideal IPS-system liquid crystal layer in which a fringe field is employed.

It is understood that the optical configuration of FIG. 10 allows light leakage in diagonal viewing angles to be reduced during black display of an IPS-system liquid crystal display device without depending on a special retardation plate, but coloring in diagonal viewing angles during black display remains a problem. The primary cause is in redundant changes in the polarization state on the Poincaré sphere, as disclosed in Japanese Laid-open Patent Application No. 2005-208356.

Reducing the wavelength dispersion of the retardation of the liquid crystal layer is an effective strategy for improving this problem. The simplest strategy is to select a liquid crystal material having a small amount of optically anisotropic wavelength dispersion, if possible. However, selections of liquid crystal materials generally have effects on video display performance and many other aspects of the display performance of the liquid crystal display device, and therefore selecting a liquid crystal material provided with a combination of all of the necessary characteristics is difficult.

Accordingly, causing the liquid-crystal cells to be multi-gapped is a practical improvement strategy. In other words, when color filters for a plurality of colors having different wavelengths displaying maximum transmittance values are provided, the cell gaps of the liquid crystal layers corresponding to color filters in which this wavelength is short are made smaller than the cell gaps of liquid crystal layers corresponding to color filters in which this wavelength is long. Specifically, in the case of a general liquid crystal display device employing three primary colors, the cell gaps should be set so that red-display pixels≧green-display pixels>blue-display pixels. When the representative wavelengths λR, λG, λB of each of the colors of red, green, and blue light are selected (these representative wavelengths change depending on the design of the white-display color temperature and the backlight specifications), the optical anisotropic wavelength dependence ΔnLC(λ) of the liquid crystal material is taken into the consideration. The cell gaps DR, DG, DB of the each of the red, green, and blue display pixels are ideally set so as to satisfy $$((\Delta nLC(\lambda)DR/\lambda R) \sim ((\Delta nLC(\lambda)DG/\lambda G) \sim ((\Delta nLC(\lambda)DB/\lambda B)$$

Positive wavelength dispersion remains in the vicinity of the representative wavelengths to the extent that the liquid crystal material has positive wavelength dispersion, but an adequate effect is obtained as described hereinafter. The effect will be improved further if, e.g., an LED of three primary colors is used as the light source of the rear-surface irradiating device, and the emission spectrum of the rear-surface irradiating device is made to be steep.

Figure 15:
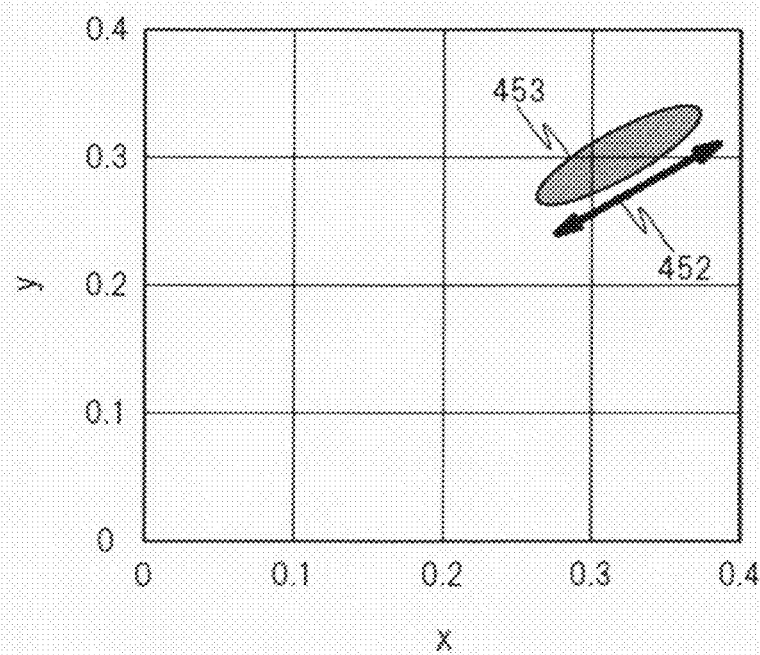
FIG. 15 is a conceptual diagram for describing the index of maximum color change for all viewing angles.

An effect of reducing diagonal coloring during black display due to multigap liquid crystal cells was confirmed by simulation for a general liquid crystal display device employing the three primary colors of red, green, and blue. The maximum color change Δu'v' for all viewing angles was used as a black-display diagonal coloring index. This definition is shown in FIG. 15. It shall be apparent that performance is favorable when Δu'v' is small.

The M value defined by the following equation was used as an index for the extent of multigapping. M=0 is ideal multigapping, and M~−2 for normal, even cell gaps.

$$M=\Delta nd(\lambda=0.46\ \mu m)-\Delta nd(\lambda=0.55\ \mu m)/(0.46-0.55)$$

Figure 16:
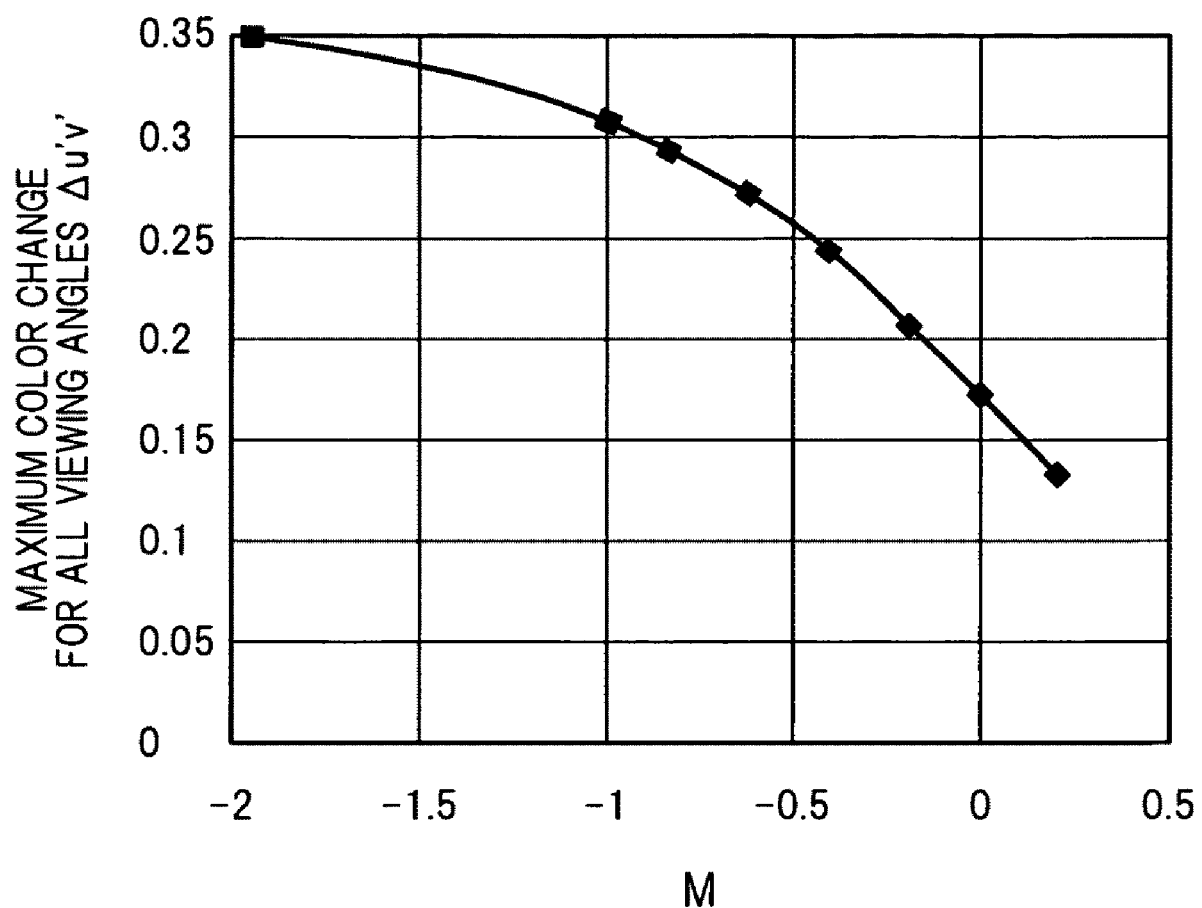
FIG. 16 is a characteristic diagram for describing the effects of the present invention.
Figure 17A:
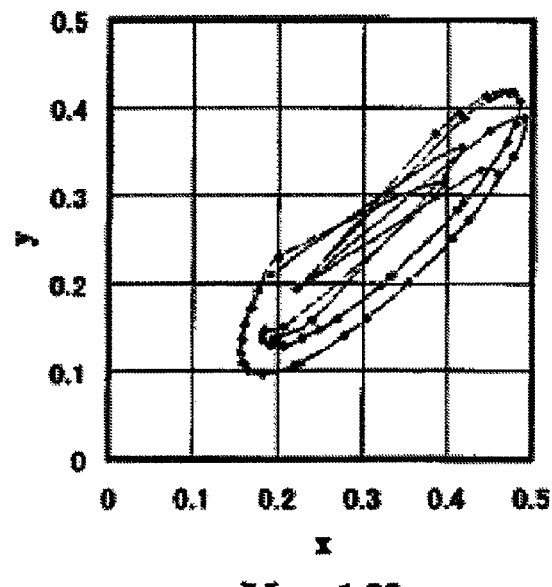
FIG. 17 is a characteristic diagram for describing the effects of the present invention.
Figure 17B:
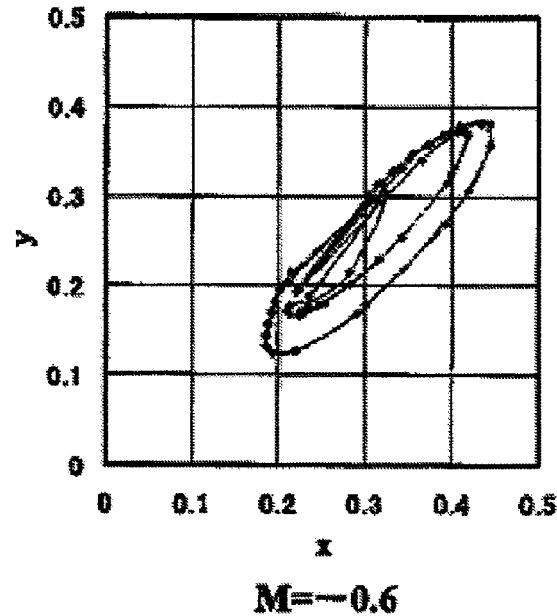
Figure 17C:
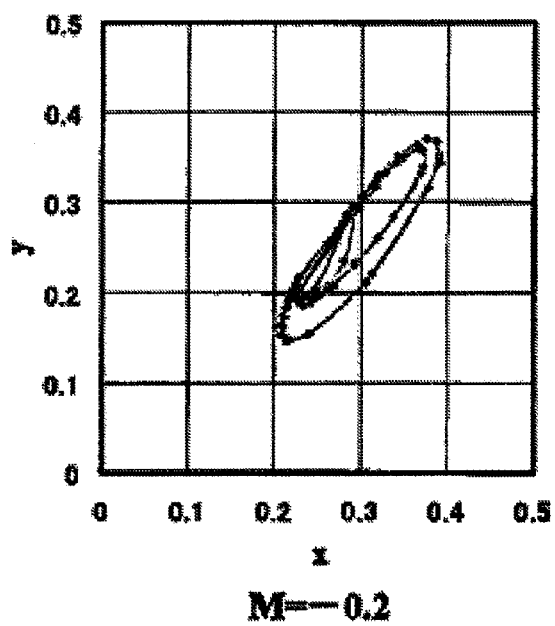
Figure 17D:
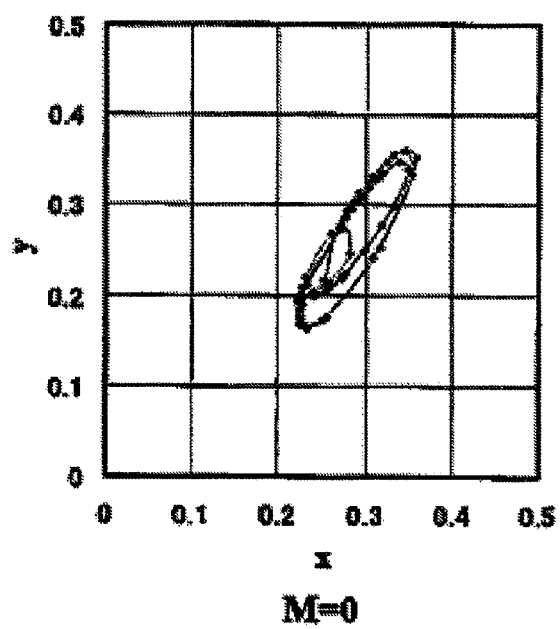

The simulation results are shown in FIGS. 16 and 17. FIG. 16 shows the correlation between the M value and the maximum color change Δu'v' for all viewing angles, and FIG. 17 is an xy chromaticity plot of each of the changes in chromaticity for all viewing angles during black display for various M values. The simulation conditions are the same as for FIG. 14. The retardation in the thickness direction of the lower polarizing-plate-supporting substrate material was 50 nm, and the retardation of the liquid crystal layer of the green pixels was 360 nm. As can be seen from FIGS. 16 and 17, the use of multigap liquid crystal cells allows diagonal coloring during black display to be significantly improved.

The birefringence of a generic polarizing-plate-supporting substrate material composed of TAC has been used until now as a negative C-plate, but as long as the Nz coefficient is 4 or more, the effects of the present invention can be adequately obtained even if a perfect negative C-plate is not used (general supporting-substrate materials actually have a slight retardation of the front surface direction and are not perfect negative C-plates). The Nz coefficient is frequently used when implementing birefringence of a medium having biaxial anisotropy in refractive index. The Nz coefficient is expressed by the following equation, where the in-plane slow axis is parallel to the direction of the x axis, the refractive indices in the directions of the x,y axes are nx, ny, respectively, and the refractive index in the direction of the z axis, i.e., in the thickness direction, is nz.

$$nz=(nx-nz)/(nx-ny)$$

Figure 18:
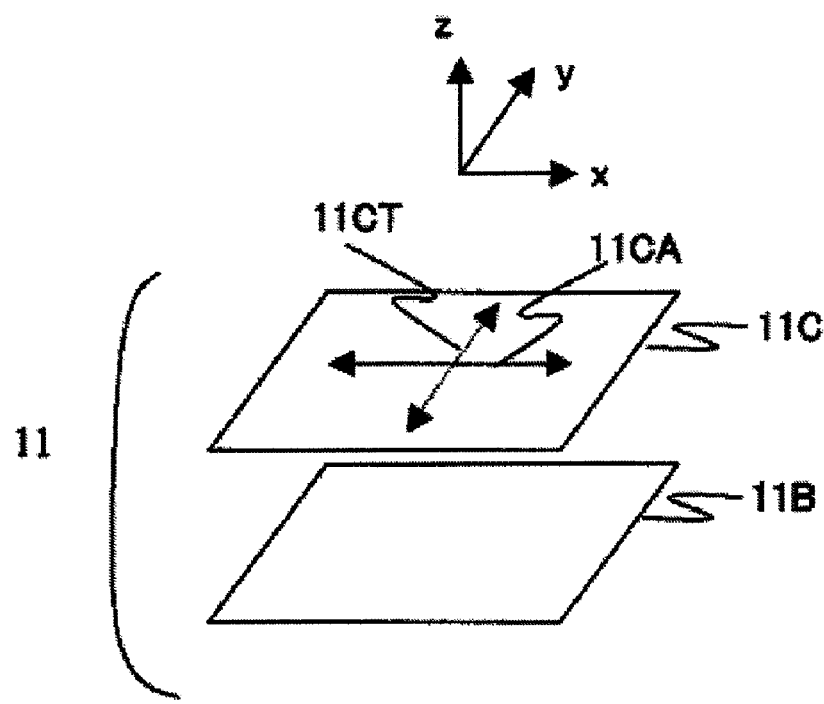
FIG. 18 is a diagram that shows an example of an optical configuration diagram of the liquid crystal display device of the present invention.
Figure 18:
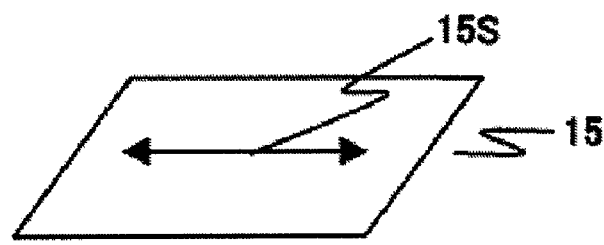
Figure 18:
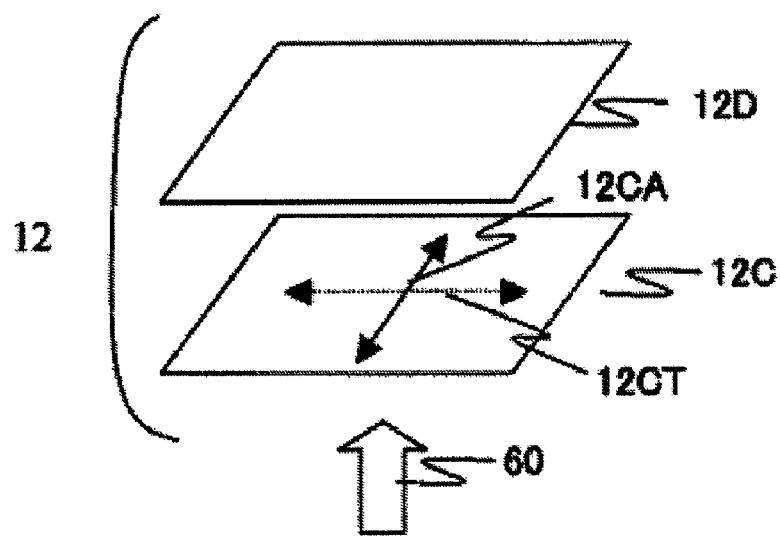

The case of o-mode was considered until now, but in the case of e-mode, the supporting-substrate material to the inside of the lower polarizing plate becomes optically isotropic, and the supporting-substrate material to the inside of the upper polarizing plate becomes a general polarizing-plate-supporting substrate material composed of TAC, as shown in FIG. 18. The viewing angle characteristics and the changes in polarization state are equivalent to the o-mode case.

Examples will be described below on the basis of the basic principles above. The present invention is not limited to the examples described below, and it shall be apparent that a variety of changes are possible in a scope that does not depart from the technical concepts of the present invention. The present example includes results determined from a numerical calculation using an optical simulation employing the 4×4 matrix method disclosed in J. Opt. Soc. Am. "Optics in Stratified and Anisotropic Media: 4×4 Matrix Formulation," by D.

W. Berreman, 1972, Volume 62, No. 4, p. 502-510. The present example assumes a liquid crystal display device provided with color filters of the three general primary colors of red, green and blue, in which a cold-cathode fluorescent tube is used as the light source of the rear-surface irradiating device. The spectral characteristics of the general three-wavelength cold cathode tube used in a large liquid-crystal television having a nominal diagonal of 30 inches or more, the spectral transmission characteristics of the red, green, and blue color filters used in the large liquid-crystal television, and the spectral characteristics of a Nitto Denko 1224DU were used for the polarizing layers of the polarizing plates. A nematic liquid crystal having an extraordinary refractive index of 1.573 and an ordinary refractive index of 1.484 was assumed as the liquid crystal molecule contained in the liquid crystal layer.

Triacetyl cellulose (TAC), polycarbonate (PC), polystyrene, norbornene-derived materials, and the like, or, alternatively, liquid-crystalline macromolecular materials were used for the wavelength dispersion of the polarizing-plate-supporting substrate materials and optical phase-compensating members, but these are not given by way of limitation. The expressions "perpendicular" and "90°" used in the examples are not meant to refer to complete perpendicularity. The essence of the present invention will be unaffected even if these are read as "substantially perpendicular" or as "the smaller angle of 88° to 90°". The case is the same for the expression "parallel".

Liquid crystal cells, electrode structure, substrates, polarizing layers for the polarizing plates, and illuminating devices conventionally used in IPS-system liquid crystal display devices can be directly applied to the examples below. The substrate that has the light-input polarizing plate provided with the first polarizing plate is the aforementioned first substrate, and the substrate that has the light-output polarizing plate provided with the second polarizing plate is the aforementioned second substrate.

The smaller angle (the pretilt angle) relative to the substrate (the first substrate, the second substrate, or both) of the optical axis of the liquid crystal layer during the absence of a voltage applied to the liquid crystal layer was set without significant limitation to 0°, but large differences in the tendencies displayed in the examples below will not occur in a range of ±3° or less. However, the most favorable characteristics were displayed in cases where the pretilt angle was 0°.

Following is a presentation of the characteristics of the present invention based on the basic principles described above. In other words, the liquid crystal display device according to the present invention is characterized as follows.

(1) A liquid crystal display device comprising a liquid crystal layer in which an electrical field is applied in a direction parallel to a first substrate, whereby a liquid crystal molecule rotates in a plane predominantly parallel to the first substrate, in which respective absorption axes of the first substrate, which is provided with a first polarizing plate on a light-input side, and a second substrate, which is provided with a second polarizing plate, are substantially perpendicular, and an optical axis of the liquid crystal molecule is oriented so as to be substantially parallel to the first substrate or the second substrate and substantially parallel to the absorption axis of the first polarizing plate; a matrix-drive electrode group, in which a pixel electrode for individual pixels and a shared electrode are positioned on a side near the liquid crystal layer of one substrate among the first substrate and the second substrate; and a rear-surface illuminating device, wherein the first polarizing plate and the second polarizing plate have a first supporting-substrate material on at least a liquid-crystal layer side of a polarizing layer of one of the first polarizing plate and the second polarizing plate and have a second supporting-substrate material on at least a liquid-crystal layer side of a polarizing layer of the other of the first polarizing plate and the second polarizing plate; the first supporting-substrate material has an Nz coefficient of 4 or more and has a birefringence so that an in-plane or thickness-direction retardation is 10 nm or more; and the second supporting-substrate material is optically isotropic so that the in-plane or thickness-direction retardation is less than 10 nm.

(2) The liquid crystal display device according to (1), wherein one of either the pixel electrode or the shared electrode is formed in a comb-tooth shape; the other of the pixel electrode or the shared electrode is formed in a flat-plate shape; and an electrical field is applied to the liquid crystal layer due to a difference in potential generated between the pixel electrode and the shared electrode.

(3) The liquid crystal display device according to any of (1) through (2), wherein the liquid crystal layer has a retardation of 340 nm or more at a wavelength of 550 nm.

(4) The liquid crystal display device according to any of (1) through (3), wherein triacetyl cellulose is used as a primary material for the first supporting-substrate material.

(5) The liquid crystal display device according to any of (1) through (4), wherein a color filter of N colors (N>2) is provided to the first substrate or the second substrate; and assuming $\lambda_M$ to be a wavelength displaying a maximum transmittance value in each of the color filters in order from shortest wavelength (M=1, 2, . . . , N), and assuming $dLC_M$ is a thickness of the liquid crystal layer corresponding to the color filter in which the wavelength displaying the maximum transmittance value is $\lambda_M$, then in a case where at least M=K ($2 \leq K \leq N$), the in equation $dLC_K > dLC_{K-1}$ is satisfied.

(6) A liquid crystal display device comprising a liquid crystal layer in which an electrical field is applied in a direction parallel to a first substrate, whereby a liquid crystal molecule rotates in a plane predominantly parallel to the first substrate, in which respective absorption axes of the first substrate, which is provided with a first polarizing plate on a light-input side, and a second substrate, which is provided with a second polarizing plate, are substantially perpendicular, and an optical axis of the liquid crystal molecule is oriented so as to be substantially parallel to the first substrate or the second substrate and substantially parallel to the absorption axis of the first polarizing plate;

a matrix-drive electrode group, in which a pixel electrode for individual pixels and a shared electrode are positioned on a side near the liquid crystal layer of one substrate among the first substrate and the second substrate; and a rear-surface illuminating device, wherein one of the first polarizing plate and the second polarizing plate has a first supporting-substrate material on at least a liquid-crystal layer side of a polarizing layer;

the other of the first polarizing plate and the second polarizing plate has a second supporting-substrate material on at least a liquid-crystal layer side of a polarizing layer;

the first supporting-substrate material and the second supporting-substrate material have a birefringence so that an in-plane or thickness-direction retardation is 10 nm or more at a wavelength of 550 nm;

the first supporting-substrate material has an Nz coefficient of 4 or more; and the second supporting-substrate material has an Nz coefficient greater than or equal to 1 and less than 1.5.

(7) The liquid crystal display device according to (6), wherein the sum of the retardation of the liquid crystal layer and the in-plane retardation of the second supporting-substrate material at a wavelength of 550 nm is 340 nm or more.

(8) The liquid crystal display device according to any of (6) through (7), wherein triacetyl cellulose is used as a primary material for the first supporting-substrate material.

(9) The liquid crystal display device according to any of (6) through (8), wherein a color filter of N colors (N>2) is provided to the first substrate or the second substrate; and assuming $\lambda_M$ to be a wavelength displaying a maximum transmittance value in each of the color filters in order from shortest wavelength (M=1, 2, ..., N), and assuming $dLC_M$ is a thickness of the liquid crystal layer corresponding to the color filter in which the wavelength displaying the maximum transmittance value is $\lambda_M$, then in a case where at least M=K ($2 \leq K \leq N$), the in equation $dLC_K > dLC_{K-1}$ is satisfied.

(10) The liquid crystal display device according to any of (6) through (9), wherein, for the second supporting-substrate material, at least one of the in-plane retardation or thickness-direction retardation has reciprocal-wavelength dispersion characteristics.

EXAMPLE 1

FIG. 1 is a schematic cross-sectional view for describing examples of a liquid crystal display device according to the present invention. The left side of FIG. 1 is a schematic cross-sectional view for describing the example 1 and the example 3 of the present invention (the right side of FIG. 1 is a schematic cross-sectional view for describing example 2 of the present invention, described hereinafter). The optical configuration of Example 1 is as shown in FIG. 10. In the present example, a generic polarizing-plate-supporting substrate material composed of TAC is used as the supporting-substrate material 12B to the inside of the lower polarizing plate, and, similarly, a polarizing-plate-supporting substrate material composed of TAC and having optical isotropy is used as the supporting-substrate material 11D to the inside of the upper polarizing plate. The retardation in the thickness direction of the supporting-substrate material 12B of the lower polarizing plate is 50 nm, and the Nz coefficient is 9.1. The liquid-crystal cell gap is 4 µm; i.e., the retardation of the liquid crystal layer is 356 nm. About the structure of the electrodes in the pixels, the pixel electrode is comb-tooth shaped and the shared electrode is flat-plate shaped. And the liquid crystal display device of the present example is an IPS system using a fringe field that is the same as the one described in Japanese Laid-open Patent Application No. 2001-056476.

Figure 19:
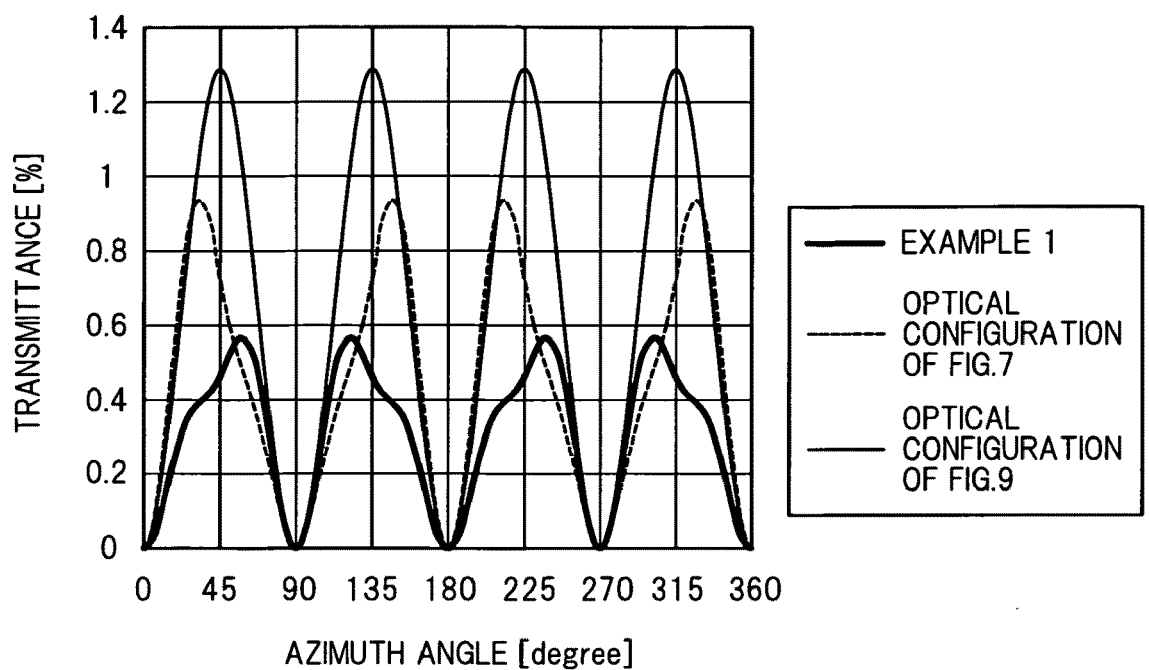
FIG. 19 is a characteristic diagram of an example of the liquid crystal display device of the present invention.

The black-display transmittance dependence when the azimuth angle is changed is shown in FIG. 19 for a 60° polar angle. For comparative purposes, only the polarizing-plate-supporting substrate material is changed, and the characteristics of the optical configuration described in FIG. 7 or FIG. 9 are also shown. FIG. 7 is a typical optical configuration in o-mode. It follows from FIG. 19 that light leakage in diagonal viewing angles during black display can be significantly reduced by the present example.

EXAMPLE 2

The structure of the present example is shown on the right side of FIG. 1, and the optical configuration is shown in FIG. 18. In Example 2, a polarizing-plate-supporting substrate material composed of TAC and having optical isotropy is used as the supporting-substrate material 12D to the inside of the lower polarizing plate, and, similarly, a general polarizing-plate-supporting substrate material composed of TAC is used as the supporting-substrate material 11B to the inside of the upper polarizing plate. The retardation in the thickness direction of the supporting-substrate material 11B of the upper polarizing plate is 50 nm, and the Nz coefficient is 9.1. The liquid-crystal cell gap is 4 µm; i.e., the retardation of the liquid crystal layer is 356 nm. About the structure of the electrodes in the pixels, the pixel electrode is comb-tooth shaped and the shared electrode is flat-plate shaped. And the liquid crystal display device of the present example is an IPS system using a fringe field that is the same as the one described in Japanese Laid-open Patent Application No. 2001-056476. The liquid-crystal pretilt angle is 2° in the present example.

Figure 20:
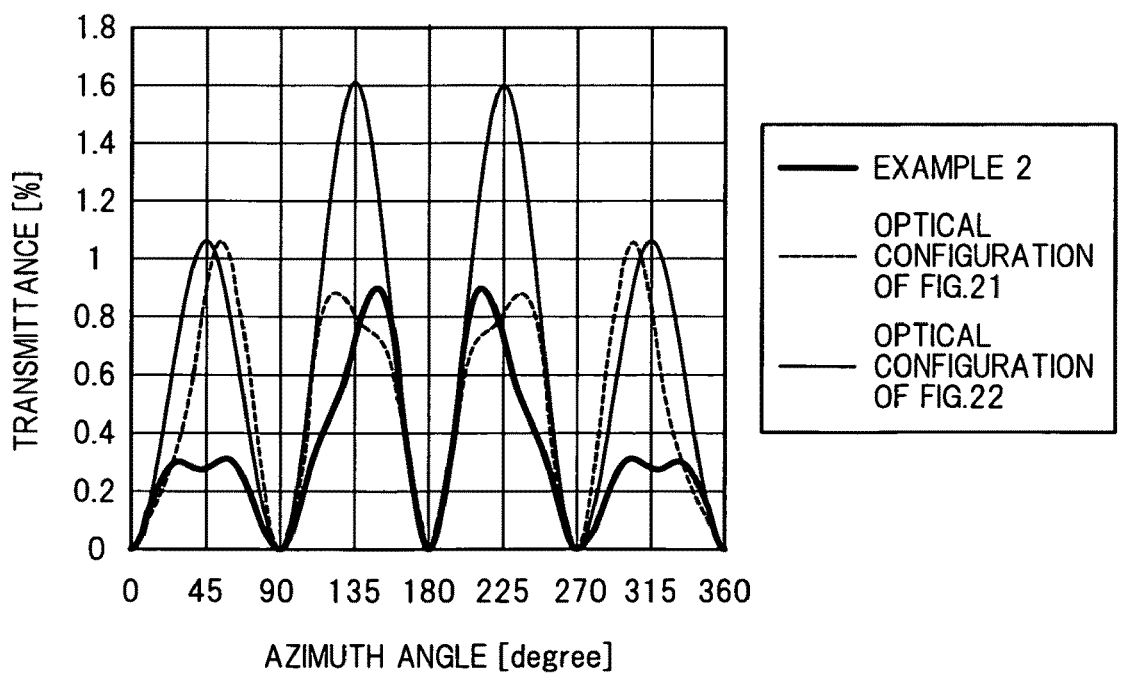
FIG. 20 is a characteristic diagram of an example of the liquid crystal display device of the present invention.
Figure 21:
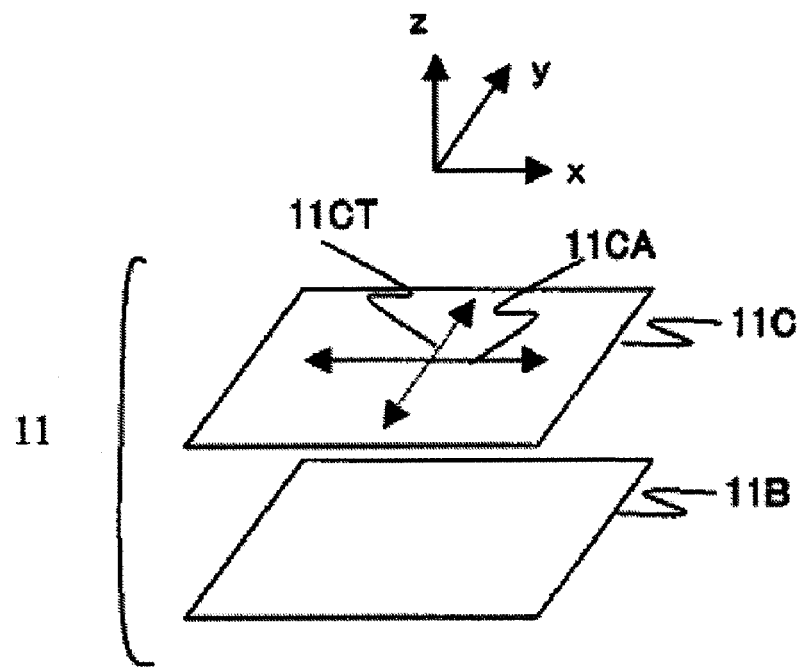
FIG. 21 is a general optical configuration diagram that has been conventionally used for IPS-system liquid crystal display devices.
Figure 21:
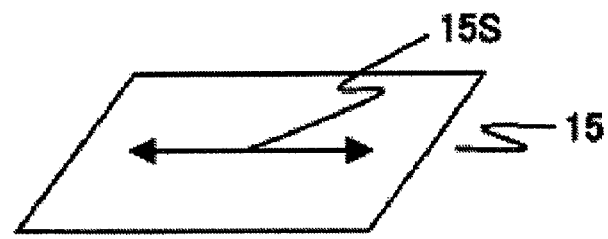
Figure 21:
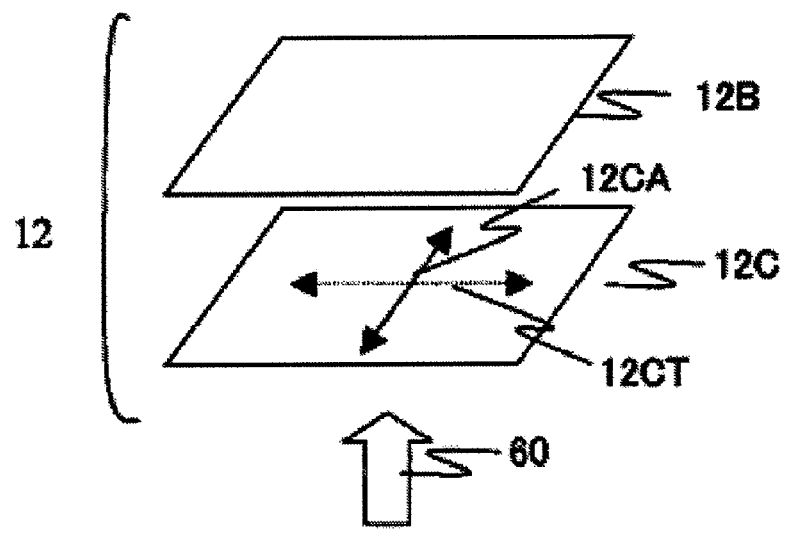
Figure 22:
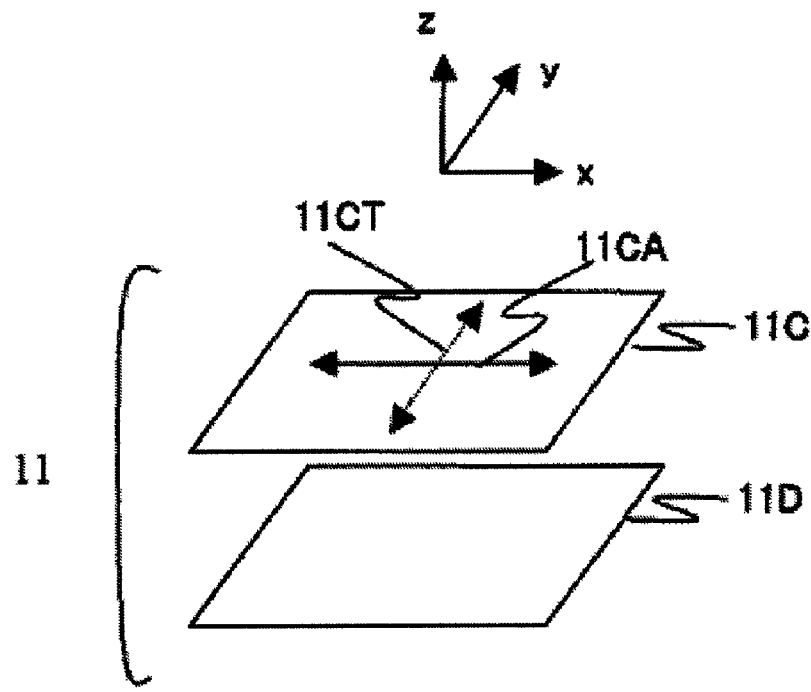
FIG. 22 is an optical configuration diagram of an IPS-system liquid crystal display device according to the prior art.
Figure 22:
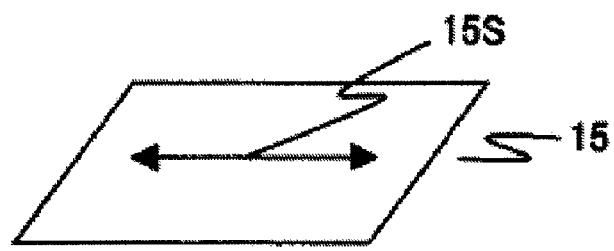
Figure 22:
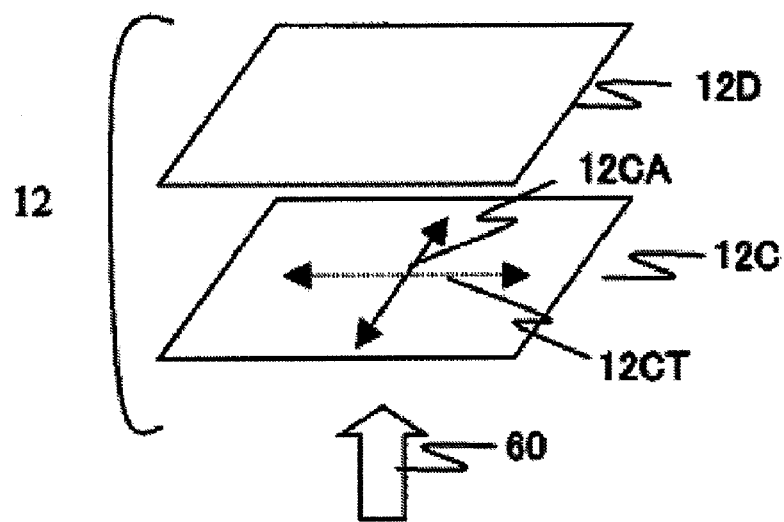

The black-display transmittance dependence when the azimuth angle is changed is shown in FIG. 20 for a 60° polar angle. For comparative purposes, only the polarizing-plate-supporting substrate material is changed, and the characteristics of the optical configuration described in FIG. 21 or FIG. 22 are also shown. FIG. 21 is a generic optical configuration diagram that has been conventionally used for IPS-system liquid crystal display devices, and is a typical configuration in e-mode. FIG. 22 is an optical configuration diagram of an IPS-system liquid crystal display device of the prior art.

It follows from FIG. 20 that light leakage in diagonal viewing angles during black display can be significantly reduced by the present example.

EXAMPLE 3

The structure of the present example is shown in FIG. 1, and the optical configuration is shown in FIG. 10. In the present example, a generic polarizing-plate-supporting substrate material composed of TAC is used as the supporting-substrate material 12B to the inside of the lower polarizing plate, and, similarly, a polarizing-plate-supporting substrate material composed of TAC and having optical isotropy is used as the supporting-substrate material 11D to the inside of the upper polarizing plate. The retardation in the thickness direction of the supporting-substrate material 12B of the lower polarizing plate is 50 nm, and the Nz coefficient is 9.1. The liquid-crystal cell gap is multigapped and is 4.6 µm for red pixels, 4.2 µm for green pixels, and 2.9 µm for blue pixels. About the structure of the electrodes in the pixels, the pixel electrode is comb-tooth shaped and the shared electrode is flat-plate shaped. And the liquid crystal display device of the present example is an IPS system using a fringe field that is the same as the one described in Japanese Laid-open Patent Application No. 2001-056476.

Figure 23:
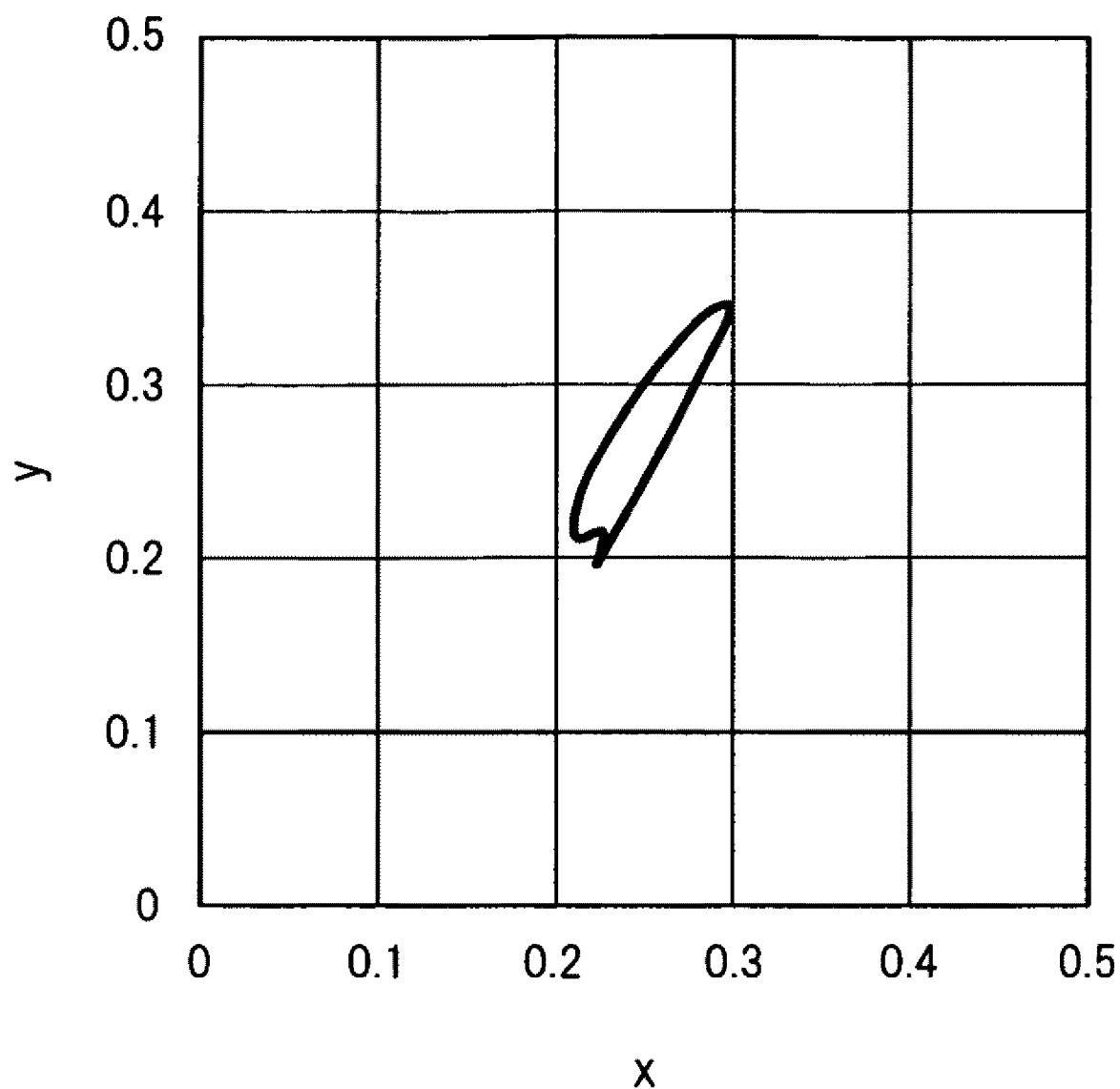
FIG. 23 is a characteristic diagram of an example of the liquid crystal display device of the present invention.

The brightness in diagonal viewing angles during black display is the same as in Example 1. The change in black-display chromaticity when the azimuth angle is changed is shown in FIG. 23 for a 60° polar angle. A comparison against with FIG. 17(a) and the like demonstrates that light leakage and coloring in diagonal viewing angles during black display can be significantly improved by the present example.

EXAMPLE 4

Figure 24:
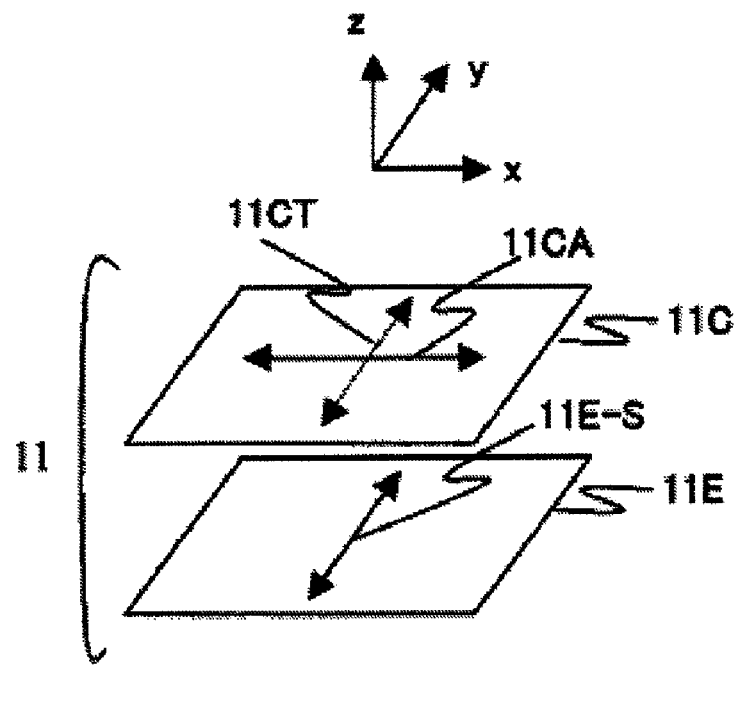
FIG. 24 is a diagram that shows an example of an optical configuration diagram of the liquid crystal display device of the present invention.
Figure 24:
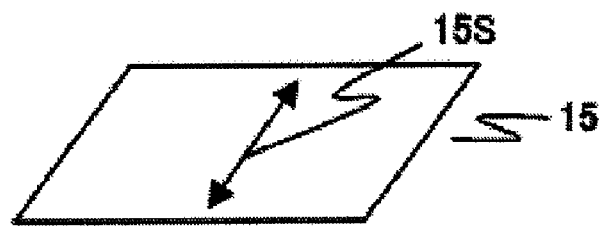
Figure 24:
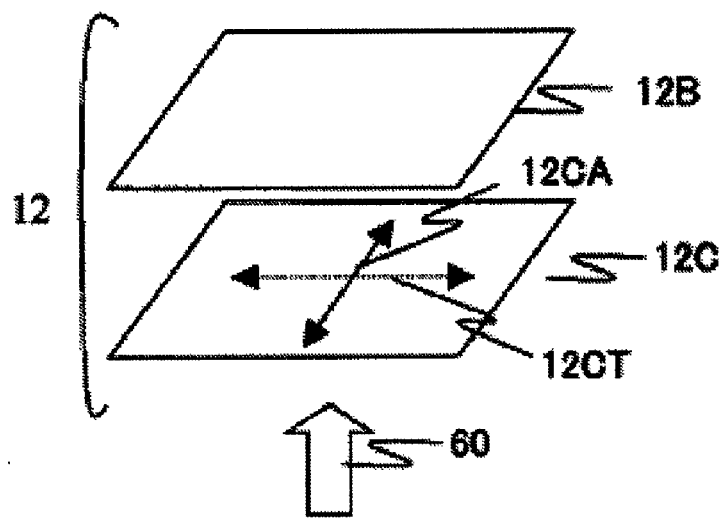

The structure of the present example is shown on the left in FIG. 2, and the optical configuration is shown in FIG. 24. In the present example, a general polarizing-plate-supporting substrate material composed of TAC is used as the supporting-substrate material 12B to the inside of the lower polarizing plate, and a film composed of a norbornene resin is used as a supporting-substrate material 11E to the inside of the upper polarizing plate. The present supporting-substrate material has ordinary positive A-plate characteristics as a birefringent medium. A slow axis 11E-S within the plane parallel to the substrate has a parallel relationship with the optical axis 15S of the liquid crystal layer 15.

The structure of the electrodes in the pixels is identical to the structure described in Japanese Laid-open Patent Application No. 9-80424, in which the pixel electrode and the shared electrode are comb-tooth shaped, and the retardation of the liquid crystal layer is approximately 300 nm. The retardation in the thickness direction of the supporting-substrate material 12B of the lower polarizing plate is 50 nm, and the Nz coefficient is 9.1.

As can be understood from FIG. 14, the reduction in light leakage in diagonal viewing angles during black display is inadequate when the retardation of the liquid crystal layer is 300 nm, even when, as in Example 1, the optical configuration of FIG. 10 is used. Accordingly, the optical configuration of the present example involves the use of the supporting-substrate material to the inside of the upper polarizing plate as a positive A-plate for compensating for the inadequacy of the retardation of the liquid crystal layer during black display. The positive A-plate birefringence medium is of a generic variety, which allows costs to be kept low.

Figure 25:
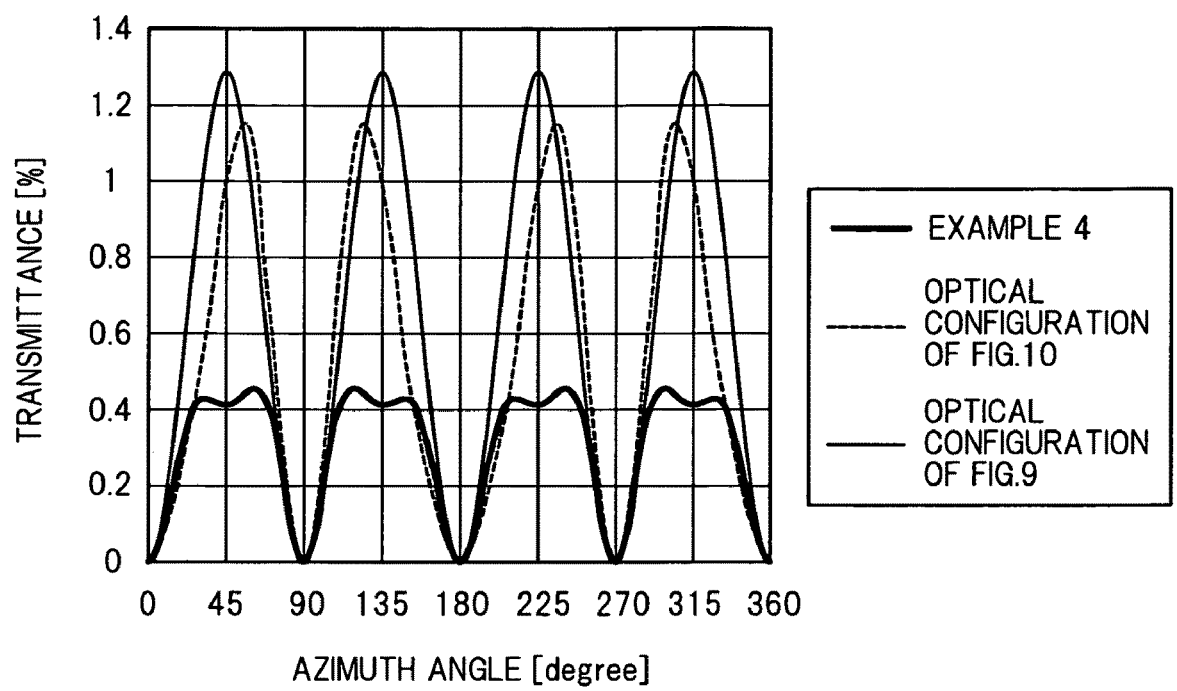
FIG. 25 is a characteristic diagram of an example of the liquid crystal display device of the present invention.

In the present example, the retardation in the plane of the supporting-substrate material 11E to the inside of the upper polarizing plate is 70 nm. The black-display transmittance dependence when the azimuth angle is changed is shown in FIG. 25 for a 60° polar angle. For comparative purposes, only the polarizing-plate supporting-substrate material is changed, and the characteristics of the optical configuration described in FIG. 9 or FIG. 10 are also shown. In the case of an IPS system in which the pixel electrode and the shared electrode are both comb-tooth shaped, and when optimization is performed in consideration of the white-display transmittance in the frontward direction, the retardation of the liquid crystal layer is approximately 300 nm, and the effect of reducing light leakage in diagonal viewing angles during black display is small even when using the optical configuration of FIG. 10, as described above. The configuration of the present example is effective as a method both for improving the white-display transmittance and for reducing light leakage in diagonal viewing angles during black display using a simple configuration.

A positive A-plate in the strict sense was used as the supporting-substrate material 11E in the present example, but an effect identical to the present example is obtained when the Nz coefficient is the range of 1 to 1.5.

Figure 26:
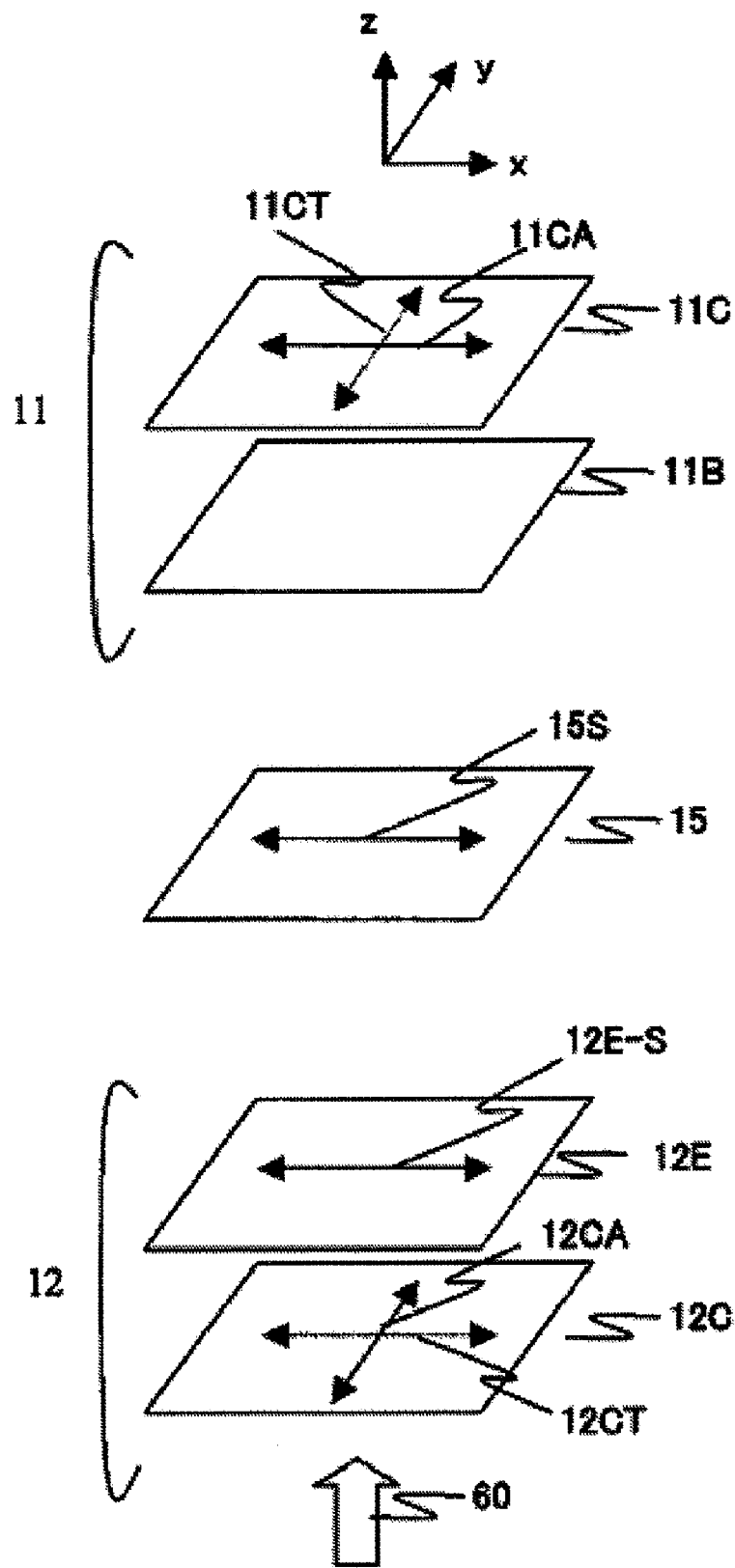
FIG. 26 is a diagram that shows an example of an optical configuration diagram of the liquid crystal display device of the present invention.

The description of the present example was for o-mode, but in the case of e-mode, the structure is the cross-sectional configuration on the right side of FIG. 2, and the optical configuration is shown in FIG. 26. An effect identical to the present example can be obtained if a medium having a birefringence similar to a negative C-plate is used as the supporting substrate 11B to the inside of the upper polarizing plate, a medium having a birefringence similar to a negative A-plate is used as a supporting-substrate material 12E to the inside of the lower polarizing plate, and a slow axis 12E-S in the plane thereof is made parallel to the optical axis 15S of the liquid crystal layer.

EXAMPLE 5

The structure of the present example is shown on the left side of FIG. 2, and the optical configuration is shown in FIG. 24. In the present example, a general polarizing-plate-supporting substrate material composed of TAC is used as the supporting-substrate material 12B to the inside of the lower polarizing plate, and a film composed of a norbornene resin is used as the supporting-substrate material 11E to the inside of the upper polarizing plate. The supporting-substrate material of the present invention has ordinary positive A-plate characteristics as a birefringent medium. The slow axis 11E-S within the plane parallel to the substrate has a parallel relationship with the optical axis 15S of the liquid crystal layer 15.

The structure of the electrodes in the pixels is identical to the structure described in Japanese Laid-open Patent Application No. 9-80424, in which the pixel electrode and the shared electrode are comb-tooth shaped, and the retardation of the liquid crystal layer is approximately 300 nm. The retardation in the thickness direction of the supporting-substrate material 12B of the lower polarizing plate is 50 nm, and the Nz coefficient is 9.1. The liquid-crystal cell gap in the present example is multigapped and is 3.8 µm for red pixels, 3.4 µm for green pixels, and 2.6 µm for blue pixels.

Figure 27:
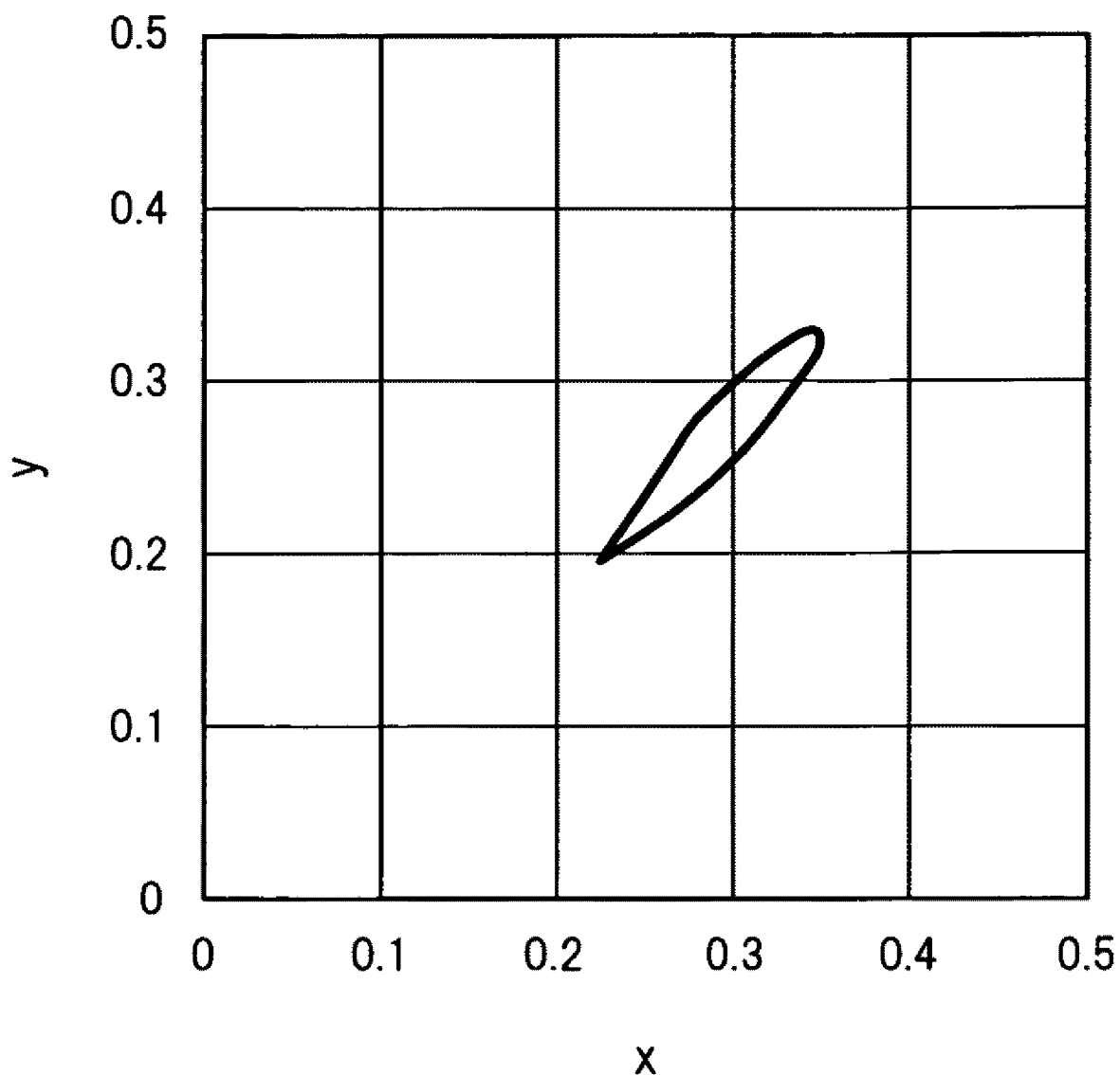
FIG. 27 is a characteristic diagram of an example of the liquid crystal display device of the present invention.

The light leakage in diagonal viewing angles during black display for Example 5 is the same as for Example 4. The change in black-display chromaticity when the azimuth angle is changed is shown in FIG. 27 for a 60° polar angle. A comparison against FIG. 17(a) and the like demonstrates that light leakage and coloring in diagonal viewing angles during black display are significantly improved by the present example.

According to the present example, the liquid crystal layer is multigapped, whereby wavelength dispersion is limited when changing the polarization state, but an identical effect can also be obtained by reciprocal (negative) wavelength dispersion of the retardation of the supporting-substrate material 11E of the upper polarizing plate.

While there have been described what are at present considered to be certain embodiments of the invention, it will be understood that various modifications may be made thereto, and it is intended that the appended claims cover all such modifications as fall within the true spirit and scope of the invention.

INDUSTRIAL APPLICABILITY

The present invention particularly relates to an in-plane switching mode (IPS mode) liquid crystal display device in which an electrical field is applied in a lateral direction to horizontally oriented liquid crystal molecules, whereby light transmittance and blockage are controlled. The present invention improves the viewing-angle characteristics (black display and low gradation) of such a device using a simple configuration and can be applied to all IPS-mode liquid crystal displays.

What is claimed is:

1. A liquid crystal display device, comprising:
    a liquid crystal layer in which an electrical field is applied in a direction parallel to a first substrate, whereby a liquid crystal molecule rotates in a plane predominantly parallel to the first substrate, in which respective absorption axes of the first substrate, which is provided with a first polarizing plate on a light-input side, and a second substrate, which is provided with a second polarizing plate, are substantially perpendicular, and an optical axis of the liquid crystal molecule is oriented so as to be substantially parallel to the first substrate or the second substrate and substantially parallel to the absorption axis of the first polarizing plate;
    a matrix-drive electrode group, in which a pixel electrode for individual pixels and a shared electrode are positioned on a side near the liquid crystal layer of one substrate among the first substrate and the second substrate; and a rear-surface illuminating device, wherein
the first polarizing plate and the second polarizing plate have a first supporting-substrate material on at least a liquid-crystal layer side of a polarizing layer of one of the first polarizing plate and the second polarizing plate and have a second supporting-substrate material on at least a liquid-crystal layer side of a polarizing layer of the other of the first polarizing plate and the second polarizing plate;
the first supporting-substrate material has an Nz coefficient of 4 or more and has a birefringence so that an in-plane or thickness-direction retardation is 10 nm or more; and
the second supporting-substrate material is optically isotropic so that the in-plane or thickness-direction retardation is less than 10 nm.

2. The liquid crystal display device according to claim 1, wherein
one of either the pixel electrode or the shared electrode is formed in a comb-tooth shape;
the other of the pixel electrode or the shared electrode is formed in a flat-plate shape; and
an electrical field is applied to the liquid crystal layer due to a difference in potential generated between the pixel electrode and the shared electrode.

3. The liquid crystal display device according to claim 1, wherein the liquid crystal layer has a retardation of 340 nm or more at a wavelength of 550 nm.

4. The liquid crystal display device according to claim 1, wherein triacetyl cellulose is used as a primary material for the first supporting-substrate material.

5. The liquid crystal display device according to claim 1, wherein
a color filter of N colors (N>2) is provided to the first substrate or the second substrate; and
assuming $\lambda_M$ to be a wavelength displaying a maximum transmittance value in each of the color filters in order from shortest wavelength (M=1, 2, ..., N), and assuming $dLC_M$ is a thickness of the liquid crystal layer corresponding to the color filter in which the wavelength displaying the maximum transmittance value is $\lambda_M$, then in a case where at least M=K ($2 \leq K \leq N$), the in equation $dLC_K > dLC_{K-1}$ is satisfied.

6. A liquid crystal display device, comprising:
a liquid crystal layer in which an electrical field is applied in a direction parallel to a first substrate, whereby a liquid crystal molecule rotates in a plane predominantly parallel to the first substrate, in which respective absorption axes of the first substrate, which is provided with a first polarizing plate on a light-input side, and a second substrate, which is provided with a second polarizing plate, are substantially perpendicular, and an optical axis of the liquid crystal molecule is oriented so as to be substantially parallel to the first substrate or the second substrate and substantially parallel to the absorption axis of the first polarizing plate;
a matrix-drive electrode group, in which a pixel electrode for individual pixels and a shared electrode are positioned on a side near the liquid crystal layer of one substrate among the first substrate and the second substrate; and
a rear-surface illuminating device, wherein
one of the first polarizing plate and the second polarizing plate has a first supporting-substrate material on at least a liquid-crystal layer side of a polarizing layer;
the other of the first polarizing plate and the second polarizing plate has a second supporting-substrate material on at least a liquid-crystal layer side of a polarizing layer;
the first supporting-substrate material and the second supporting-substrate material have a birefringence so that an in-plane or thickness-direction retardation is 10 nm or more at a wavelength of 550 nm;
the first supporting-substrate material has an Nz coefficient of 4 or more; and
the second supporting-substrate material has an Nz coefficient greater than or equal to 1 and less than 1.5.

7. The liquid crystal display device according to claim 6, wherein the sum of the retardation of the liquid crystal layer and the in-plane retardation of the second supporting-substrate material at a wavelength of 550 nm is 340 nm or more.

8. The liquid crystal display device according to claim 6, wherein triacetyl cellulose is used as a primary material for the first supporting-substrate material.

9. The liquid crystal display device according to claim 6, wherein
a color filter of N colors (N$\geq$2) is provided to the first substrate or the second substrate; and
assuming $\lambda_M$ to be a wavelength displaying a maximum transmittance value in each of the color filters in order from shortest wavelength (M=1, 2, ..., N), and assuming $dLC_M$ is a thickness of the liquid crystal layer corresponding to the color filter in which the wavelength displaying the maximum transmittance value is $\lambda_M$, then in a case where at least M=K ($2 \leq K \leq N$), the in equation $dLC_K > dLC_{K-1}$ is satisfied.

10. The liquid crystal display device according to claim 6, wherein, for the second supporting-substrate material, at least one of the in-plane retardation or thickness-direction retardation has reciprocal-wavelength dispersion characteristics.

* * * * *